US012786748B2

(12) United States Patent
Ren et al.

(10) Patent No.: US 12,786,748 B2
(45) Date of Patent: Nov. 3, 2026

(54) COMBINED ML STRUCTURE PARAMETERS CONFIGURATION

(71) Applicant: QUALCOMM Incorporated, San Diego, CA (US)

(72) Inventors: Yuwei Ren, Beijing (CN); Huilin Xu, Temecula, CA (US); June Namgoong, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 235 days.

(21) Appl. No.: 18/572,152

(22) PCT Filed: Aug. 10, 2021

(86) PCT No.: PCT/CN2021/111689

§ 371 (c)(1),
(2) Date: Dec. 19, 2023

(87) PCT Pub. No.: WO2023/015430

PCT Pub. Date: Feb. 16, 2023

(65) Prior Publication Data

US 2024/0292235 A1 Aug. 29, 2024

(51) Int. Cl.
*H04W 24/02* (2009.01)
*G06N 3/0464* (2023.01)

(52) U.S. Cl.
CPC .......... *H04W 24/02* (2013.01); *G06N 3/0464* (2023.01)

(58) Field of Classification Search
None
See application file for complete search history.

(56) References Cited

U.S. PATENT DOCUMENTS 10,039,016 B1 * 7/2018 Larish .................. H04W 24/02
10,524,145 B1 * 12/2019 Das ..................... H04L 41/5019
2019/0164087 A1 5/2019 Ghibril et al.
2021/0185515 A1 * 6/2021 Bao ........................ G06N 3/008
2024/0152809 A1 * 5/2024 Alakuijala ............ G06N 20/00

FOREIGN PATENT DOCUMENTS

CN 110891283 A 3/2020
CN 112868033 A 5/2021
WO 2021089568 A1 5/2021

OTHER PUBLICATIONS

International Search Report and Written Opinion—PCT/CN2021/111689—ISA/EPO—Jan. 31, 2022.

* cited by examiner

*Primary Examiner* — Diane L Lo
(74) *Attorney, Agent, or Firm* — Procopio, Cory, Hargreaves & Savitch LLP/QUALCOMM Incorporated

(57) ABSTRACT

A UE may receive a first configuration for at least one first ML block and a second configuration for at least one second ML block. The at least one first ML block may be configured with at least one first parameter for a first procedure and the at least one second ML block may be configured with at least one second parameter for a second procedure. The at least one second ML block may be dedicated to a task included in a plurality of tasks associated with the at least one first ML block. The UE may activate an ML model based on an association of the at least one second ML block configured with the at least one second parameter with the at least one first ML block configured with the at least one first parameter.

30 Claims, 15 Drawing Sheets

800

| Parameter Name | Function |
|---|---|
| Backbone block ID | Indicates different ML backbone blocks (e.g., based on backbone block index) |
| Timer | Indicates available time |
| Input format | Indicate an input format to an ML model |
| BWP ID | Indicates available BWP based on index |
| others | . . . |

FIG. 8

900

| Parameter Name | Function |
| --- | --- |
| Specific/Dedicated block ID | Indicates specific/dedicated blocks (e.g., based on specific/dedicated block index) |
| Timer | Indicates available time |
| Backbone block ID | Indicates associated backbone blocks/model |
| Task ID | Indicates purpose of ML model |
| Output format | Indicate an output format of an ML model |
| Specific/Dedicated block type | Indicates cell-specific block (for group of UEs) or UE-specific block |
| Condition ID | Indicates a condition for enabling the ML model |
| Granularity | Indicates a performance level |
| others | . . . |

FIG. 9

COMBINED ML STRUCTURE PARAMETERS CONFIGURATION

CROSS REFERENCE TO RELATED APPLICATION(S)

This application is a National Stage Application filed under 35 U.S.C. § 371 of PCT International Application No. PCT/CN2021/111689, entitled "THE COMBINED ML STRUCTURE PARAMETERS CONFIGURATION" and filed Aug. 10, 2021, which is expressly incorporated by reference herein in its entirety.

INTRODUCTION

The present disclosure relates generally to communication systems, and more particularly, to parameter configurations for a machine learning (ML) model.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communication (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method of wireless communication at a user equipment (UE) is provided. The method includes receiving a first configuration for at least one first machine learning (ML) block, the at least one first ML block configured with at least one first parameter for a first procedure of the at least one first ML block; receiving a second configuration for at least one second ML block, the at least one second ML block configured with at least one second parameter for a second procedure of the at least one second ML block, the at least one second ML block dedicated to a task included in a plurality of tasks associated with the at least one first ML block; and activating an ML model based on an association of the at least one second ML block configured with the at least one second parameter with the at least one first ML block configured with the at least one first parameter.

In another aspect of the disclosure, an apparatus for wireless communication at a UE is provided. The apparatus includes means for receiving a first configuration for at least one first ML block, the at least one first ML block configured with at least one first parameter for a first procedure of the at least one first ML block; means for receiving a second configuration for at least one second ML block, the at least one second ML block configured with at least one second parameter for a second procedure of the at least one second ML block, the at least one second ML block dedicated to a task included in a plurality of tasks associated with the at least one first ML block; and means for activating an ML model based on an association of the at least one second ML block configured with the at least one second parameter with the at least one first ML block configured with the at least one first parameter.

In another aspect of the disclosure, an apparatus for wireless communication at a UE is provided. The apparatus includes a memory and at least one processor coupled to the memory, the memory and the at least one processor configured to receive a first configuration for at least one first ML block, the at least one first ML block configured with at least one first parameter for a first procedure of the at least one first ML block; receive a second configuration for at least one second ML block, the at least one second ML block configured with at least one second parameter for a second procedure of the at least one second ML block, the at least one second ML block dedicated to a task included in a plurality of tasks associated with the at least one first ML block; and activate an ML model based on an association of the at least one second ML block configured with the at least one second parameter with the at least one first ML block configured with the at least one first parameter.

In another aspect of the disclosure, a non-transitory computer-readable storage medium at a UE, is provided. The non-transitory computer-readable storage medium is configured to receive a first configuration for at least one first ML block, the at least one first ML block configured with at least one first parameter for a first procedure of the at least one first ML block; receive a second configuration for at least one second ML block, the at least one second ML block configured with at least one second parameter for a second procedure of the at least one second ML block, the at least one second ML block dedicated to a task included in a plurality of tasks associated with the at least one first ML block; and activate an ML model based on an association of the at least one second ML block configured with the at least one second parameter with the at least one first ML block configured with the at least one first parameter.

In another aspect of the disclosure, a method of wireless communication at a base station is provided. The method includes receiving an indication of a UE capability for associating at least one second ML block with at least one first ML block; transmitting, based on the UE capability, a first configuration for at least one first ML block, the at least one first ML block configured with at least one first parameter for a first procedure of the at least one first ML block; and transmitting, based on the UE capability, a second configuration for at least one second ML block, the at least one second ML block configured with at least one second parameter for a second procedure of the at least one second ML block, the at least one second ML block dedicated to a task included in a plurality of tasks associated with the at least one first ML block.

In another aspect of the disclosure, an apparatus for wireless communication at a base station is provided. The apparatus includes means for receiving an indication of a UE capability for associating at least one second ML block with at least one first ML block; means for transmitting, based on the UE capability, a first configuration for at least one first ML block, the at least one first ML block configured with at least one first parameter for a first procedure of the at least one first ML block; and means for transmitting, based on the UE capability, a second configuration for at least one second ML block, the at least one second ML block configured with at least one second parameter for a second procedure of the at least one second ML block, the at least one second ML block dedicated to a task included in a plurality of tasks associated with the at least one first ML block.

In another aspect of the disclosure, an apparatus for wireless communication at a base station is provided. The apparatus includes a memory and at least one processor coupled to the memory, the memory and the at least one processor configured to receive an indication of a UE capability for associating at least one second ML block with at least one first ML block; transmit, based on the UE capability, a first configuration for at least one first ML block, the at least one first ML block configured with at least one first parameter for a first procedure of the at least one first ML block; and transmit, based on the UE capability, a second configuration for at least one second ML block, the at least one second ML block configured with at least one second parameter for a second procedure of the at least one second ML block, the at least one second ML block dedicated to a task included in a plurality of tasks associated with the at least one first ML block.

In another aspect of the disclosure, a non-transitory computer-readable storage medium at a base station, is provided. The non-transitory computer-readable storage medium is configured to receive an indication of a UE capability for associating at least one second ML block with at least one first ML block; transmit, based on the UE capability, a first configuration for at least one first ML block, the at least one first ML block configured with at least one first parameter for a first procedure of the at least one first ML block; and transmit, based on the UE capability, a second configuration for at least one second ML block, the at least one second ML block configured with at least one second parameter for a second procedure of the at least one second ML block, the at least one second ML block dedicated to a task included in a plurality of tasks associated with the at least one first ML block.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 8 is a table indicative of example backbone block parameters.

FIG. 9 is a table indicative of example specific/dedicated block parameters.

DETAILED DESCRIPTION

Figure 1:
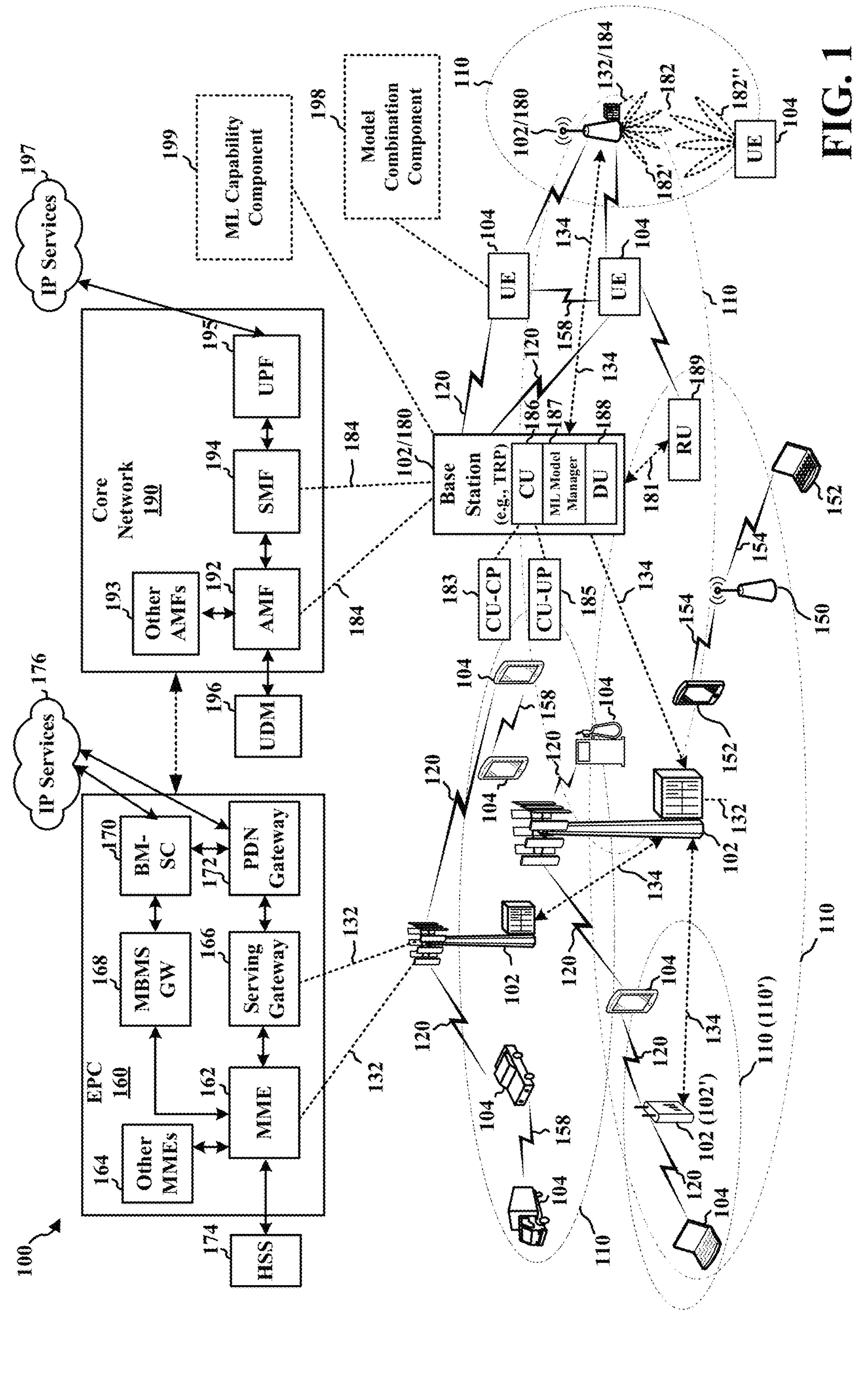
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, aggregated or disaggregated components (e.g., associated with a user equipment (UE) and/or a base station), end-user devices, etc. of varying sizes, shapes, and constitution.

Machine learning (ML) techniques may be based on one or more computer algorithms that are trained to automatically provide improved outputs for a processing operation based on stored training data and/or one or more prior executions. An ML model refers to an algorithm that is trained to recognize certain types of patterns, e.g., associated with the stored training data and/or the one or more prior executions, to learn/predict the improved outputs for the processing operation. ML models that are trained at a first device may be configured to a second device. For example, a network may transmit an ML model configuration to a UE to configure the UE with the ML model that was trained at the network, such that the UE may execute the ML model after receiving the ML model configuration from the network.

ML models may be used in wireless communication. Aspects presented herein include combining a backbone/general block associated with a first set of parameters with a specific/dedicated block associated with a second set of parameters to generate a combined ML model. A "block" refers to at least a portion of the algorithm that is trained to recognize the certain types of patterns associated with the processing operation. A general block, or block that is common to multiple ML models, may also be referred to as a "backbone" block. A block that is specific to a particular ML model may be referred to as a "specific" block or as a "dedicated" block. According to some aspects, an association between the backbone/general block and the specific/dedicated block may be determined based on a task or a condition of a UE. For example, a condition of the UE may correspond to a UE positioning procedure and a task of the UE may correspond to indoor positioning or outdoor positioning. The association may provide reduced signaling costs and flexibility for ML model configurations for different tasks or conditions of the UE. According to one or more aspects, the network may separately configure the backbone/general blocks and the specific/dedicated blocks to the UE.

The combined ML model refers to an ML model that is generated by combining a specific/dedicated block with a backbone/general block. Parameters used for the blocks of the combined ML model may be signaled separately to the UE by the network. In one or more aspects, the parameters may be associated with information used for generating the combined ML model. For example, the parameters may be indicative of the association between the backbone/general block and the specific/dedicated block. Since different blocks may be combined to the UE to generate different combined ML models, a particular specific/dedicated block may be selected for association with a particular backbone/general block to generate a particular combined ML model for the task/condition of the UE. If a performance of the combined ML model is not balanced with a complexity of the combined ML model, some UEs may experience degraded performance.

Accordingly, signaling to the UE may be indicative of ML block combinations for the combined ML model and may enable balancing of model performance with model complexity at the UE. As the backbone/general block and the specific dedicated block may be transmitted to the UE via separate configurations, a first configuration for the backbone/general block may include one or more backbone/general block parameters, such as a backbone block identifier (ID), a timer, an input format, a bandwidth part (BWP) ID, and/or other types of backbone/general block parameters. A second configuration for the specific/dedicated block may include one or more specific/dedicated block parameters, such as a specific/dedicated block ID, a timer, a backbone block ID, a task ID, an output format, a specific/dedicated block type, a condition ID, a granularity/performance level, and/or other types of specific/dedicated block parameters.

According to one or more aspects, the UE may indicate a UE capability to the network for the combined ML model configuration, such that the parameters for the specific/dedicated block and/or the parameters for the backbone/general block may be configured for the UE based on the indicated UE capability. For instance, a UE capability report may indicate a maximum number of specific/dedicated blocks per BWP, a maximum number of specific/dedicated blocks per slot, a maximum number of backbone/general blocks, a maximum number of ML models that may be executed simultaneously, etc. Alternatively, the UE capability for the combined ML model configuration may be based on one or more predefined protocols. The UE may associate the specific/dedicated blocks with the backbone/general blocks based on a network indication of one or more of both the specific/dedicated blocks and the backbone/general blocks, both a specific/dedicated block index and a backbone/general block index, or the specific/dedicated block index (and not the backbone/general block index). Additionally, the UE may switch between ML models based on the backbone/general blocks and the specific/dedicated blocks configured to the UE via the associated parameter configurations. Both configuration costs and association complexity between the backbone/general blocks and the specific/dedicated blocks may be reduced based on such techniques. Reduced ML model complexity may increase performance of the UE (e.g., based on improved processing times).

FIG. 1 is a diagram illustrating an example of a wireless communications system and an access network 100. Referring to FIG. 1, in certain aspects, a UE 104 may include a model combination component 198 configured to receive a first configuration for at least one first ML block, the at least one first ML block configured with at least one first parameter for a first procedure of the at least one first ML block; receive a second configuration for at least one second ML block, the at least one second ML block configured with at least one second parameter for a second procedure of the at least one second ML block, the at least one second ML block dedicated to a task included in a plurality of tasks associated with the at least one first ML block; and activate an ML model based on an association of the at least one second ML block configured with the at least one second parameter with the at least one first ML block configured with the at least one first parameter. In certain aspects, a base station 180 may include an ML capability component 199 configured to receive an indication of a UE capability for associating at least one second ML block with at least one first ML block; transmit, based on the UE capability, a first configuration for at least one first ML block, the at least one first ML block configured with at least one first parameter for a first procedure of the at least one first ML block; and transmit, based on the UE capability, a second configuration for at least one second ML block, the at least one second ML block configured with at least one second parameter for a second procedure that is more limited than the first procedure. Although the following description may be focused on 5G NR, the concepts described herein may be applicable to other similar areas, such as LTE, LTE-A, CDMA, GSM, and other wireless technologies.

The wireless communications system (also referred to as a wireless wide area network (WWAN)) in FIG. 1 is illustrated to include base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, which may be associated with the second backhaul link 184 from the base station 102, other AMFs 193, a Session Management Function (SMF) 194, which may also be associated with the second backhaul link 184 from the base station 102, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station 102 may include and/or be referred to as a gNB, Node B, cNB, an access point, a base transceiver station, a radio base station, a radio transceiver, a transceiver function, a basic service set (BSS), an extended service set (ESS), a transmit reception point (TRP), or some other suitable terminology. The base station 102 may include a centralized unit (CU) 186 for higher layers of a protocol stack and/or a distributed unit (DU) 188 for lower layers of the protocol stack. The CU 186 may be associated with a CU-control plane (CU-CP) 183 and a CU-user plane (CU-UP) 185. The CU-CP 183 may be a logical node that hosts a radio resource control (RRC) and a control portion of a packet data convergence protocol (PDCP). The CU-UP 185 may be a logical node that hosts a user plane portion of the PDCP. The base station 102 may also include an ML model manager 187 that may authorize the UE 104 to download one or more ML models from the network. In further aspects, the base station 102 may communicate with a radio unit (RU) 189 over a fronthaul link 181. For example, the RU 189 may relay communications between the DU 188 and the UE 104. Accordingly, while some functions, operations, procedures, etc., may be described herein for exemplary purposes in association with a base station, the functions, operations, procedures, etc., may be additionally or alternatively performed by other devices, such as devices associated with open-RAN (O-RAN) deployments.

The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Figures 2A, 2B, 2C, 2D:
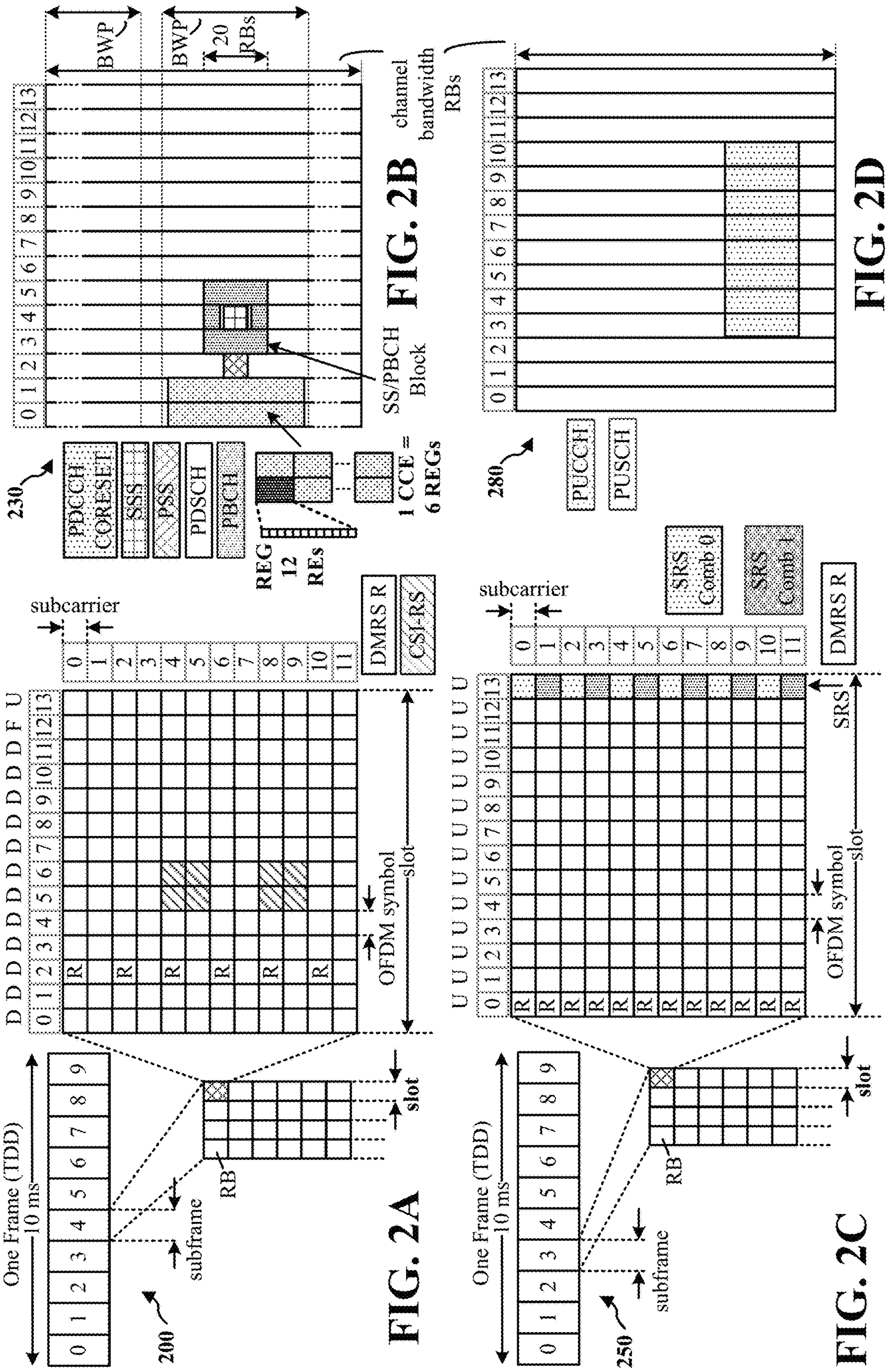
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through RRC signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different BWPs (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
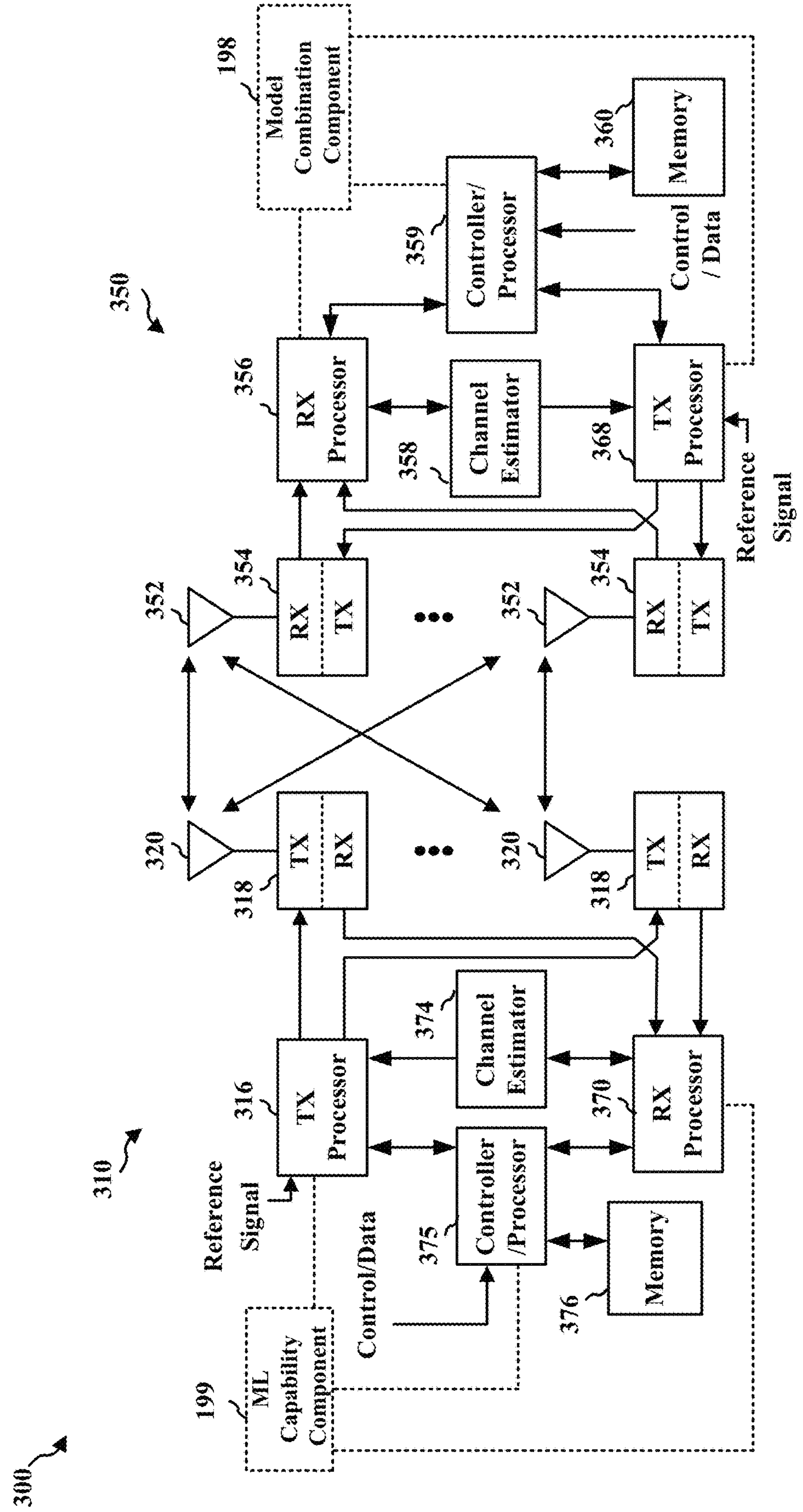
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes an RRC layer, and layer 2 includes a service data adaptation protocol (SDAP) layer, a PDCP layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the model combination component 198 of FIG. 1.

At least one of the TX processor 316, the RX processor 370, and the controller/processor 375 may be configured to perform aspects in connection with the ML capability component 199 of FIG. 1.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with eMBB, mMTC, and ultra-reliable low latency communication (URLLC) may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

Figure 4:
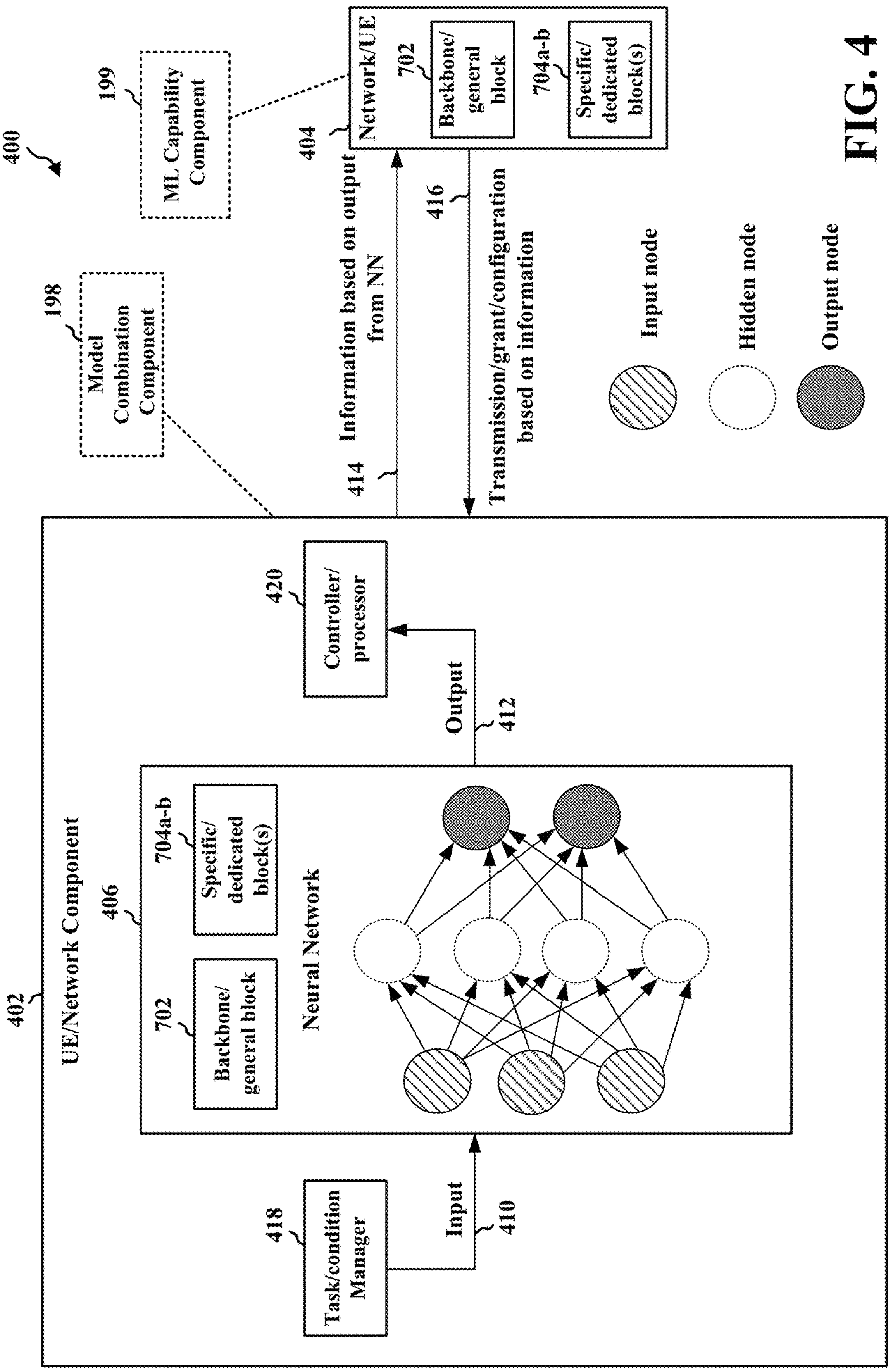
FIG. 4 illustrates a diagram of a UE that includes a neural network configured for determining communications with a second device.

FIG. 4 illustrates a diagram 400 of a first wireless communication device 402 that includes a neural network 406 configured for determining communications with a second device 404. In some aspects, the neural network 406 may be included in a UE. The first wireless communication device 402 may be a UE, and the second device 404 may correspond to a second UE, a base station, or other network component, such as a core network component. In some aspects, the neural network 406 may be included in a network component. The first wireless communication device 402 may be one network component, and the second device 404 may be a second network component. A UE and/or a base station (e.g., including a centralized unit (CU) and/or a distributed unit (DU)) may use machine-learning algorithms, deep-learning algorithms, neural networks, reinforcement learning, regression, boosting, or advanced signal processing methods for aspects of wireless communication, e.g., with a base station, a TRP, another UE, etc. The CU may provide higher layers of a protocol stack, such the SDAP, PDCP, RRC, etc., while the DU may provide lower layers of the protocol stack, such as the RLC, MAC, PHY, etc. A single CU may control multiple DUs, and each DU may be associated with one or more cells.

Reinforcement learning is a type of machine learning that involves the concept of taking actions in an environment in order to maximize a reward. Reinforcement learning is a machine learning paradigm; other paradigms include supervised learning and unsupervised learning. Basic reinforcement may be modeled as a Markov decision process (MDP) having a set of environment and agent states, and a set of actions of the agent. The process may include a probability of a state transition based on an action and a representation of a reward after the transition. The agent's action selection may be modeled as a policy. The reinforcement learning may enable the agent to learn an optimal, or nearly-optimal, policy that maximizes a reward. Supervised learning may include learning a function that maps an input to an output based on example input-output pairs, which may be inferred from a set of training data, which may be referred to as training examples. The supervised learning algorithm analyzes the training data and provides an algorithm to map to new examples. Federated learning (FL) procedures that use edge devices as clients may rely on the clients being trained based on supervised learning.

Regression analysis may include statistical processes for estimating the relationships between a dependent variable (e.g., which may be referred to as an outcome variable) and independent variable(s). Linear regression is one example of regression analysis. Non-linear models may also be used. Regression analysis may include inferring causal relationships between variables in a dataset.

Boosting includes one or more algorithms for reducing bias and/or variance in supervised learning, such as machine learning algorithms that convert weak learners (e.g., a classifier that is slightly correlated with a true classification) to strong ones (e.g., a classifier that is more closely correlated with the true classification). Boosting may include iterative learning based on weak classifiers with respect to a distribution that is added to a strong classifier. The weak learners may be weighted related to accuracy. The data weights may be readjusted through the process. In some aspects described herein, an encoding device (e.g., a UE, base station, or other network component) may train one or more neural networks to learn dependence of measured qualities on individual parameters.

The second device 404 may be a base station in some examples. The second device 404 may be a TRP in some examples. The second device 404 may be a network component, such as a DU, in some examples. The second device 404 may be another UE in some examples, e.g., if the communication between the first wireless device 402 and the second device 404 is based on sidelink. Although some example aspects of machine learning and a neural network are described for an example of a UE, the aspects may similarly be applied by a base station, an IAB node, or another training host.

Among others, examples of machine learning models or neural networks that may be included in the first wireless device 402 include artificial neural networks (ANN); decision tree learning; convolutional neural networks (CNNs); deep learning architectures in which an output of a first layer of neurons becomes an input to a second layer of neurons, and so forth; support vector machines (SVM), e.g., including a separating hyperplane (e.g., decision boundary) that categorizes data; regression analysis; bayesian networks; genetic algorithms; Deep convolutional networks (DCNs) configured with additional pooling and normalization layers; and Deep belief networks (DBNs).

A machine learning model, such as an artificial neural network (ANN), may include an interconnected group of artificial neurons (e.g., neuron models), and may be a computational device or may represent a method to be performed by a computational device. The connections of the neuron models may be modeled as weights. Machine learning models may provide predictive modeling, adaptive control, and other applications through training via a dataset. The model may be adaptive based on external or internal information that is processed by the machine learning model. Machine learning may provide non-linear statistical data model or decision making and may model complex relationships between input data and output information.

A machine learning model may include multiple layers and/or operations that may be formed by concatenation of one or more of the referenced operations. Examples of operations that may be involved include extraction of various features of data, convolution operations, fully connected operations that may be activated or deactivated, compression, decompression, quantization, flattening, etc. As used herein, a "layer" of a machine learning model may be used to denote an operation on input data. For example, a convolution layer, a fully connected layer, and/or the like may be used to refer to associated operations on data that is input into a layer. A convolution A×B operation refers to an operation that converts a number of input features A into a number of output features B. "Kernel size" may refer to a number of adjacent coefficients that are combined in a dimension. As used herein, "weight" may be used to denote one or more coefficients used in the operations in the layers for combining various rows and/or columns of input data. For example, a fully connected layer operation may have an output y that is determined based at least in part on a sum of a product of input matrix x and weights A (which may be a matrix) and bias values B (which may be a matrix). The term "weights" may be used herein to generically refer to both weights and bias values. Weights and biases are examples of parameters of a trained machine learning model. Different layers of a machine learning model may be trained separately.

Machine learning models may include a variety of connectivity patterns, e.g., including any of feed-forward networks, hierarchical layers, recurrent architectures, feedback connections, etc. The connections between layers of a neural network may be fully connected or locally connected. In a fully connected network, a neuron in a first layer may communicate its output to each neuron in a second layer, and each neuron in the second layer may receive input from every neuron in the first layer. In a locally connected network, a neuron in a first layer may be connected to a limited number of neurons in the second layer. In some aspects, a convolutional network may be locally connected and configured with shared connection strengths associated with the inputs for each neuron in the second layer. A locally connected layer of a network may be configured such that each neuron in a layer has the same, or similar, connectivity pattern, but with different connection strengths.

A machine learning model or neural network may be trained. For example, a machine learning model may be trained based on supervised learning. During training, the machine learning model may be presented with an input that the model uses to compute to produce an output. The actual output may be compared to a target output, and the difference may be used to adjust parameters (such as weights and biases) of the machine learning model in order to provide an output closer to the target output. Before training, the output may be incorrect or less accurate, and an error, or difference, may be calculated between the actual output and the target output. The weights of the machine learning model may then be adjusted so that the output is more closely aligned with the target. To adjust the weights, a learning algorithm may compute a gradient vector for the weights. The gradient may indicate an amount that an error would increase or decrease if the weight were adjusted slightly. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted so as to reduce the error or to move the output closer to the target. This manner of adjusting the weights may be referred to as back propagation through the neural network. The process may continue until an achievable error rate stops decreasing or until the error rate has reached a target level.

The machine learning models may include computational complexity and substantial processor for training the machine learning model. FIG. 4 illustrates that an example neural network 406 may include a network of interconnected nodes. An output of one node is connected as the input to another node. Connections between nodes may be referred to as edges, and weights may be applied to the connections/edges to adjust the output from one node that is applied as the input to another node. Nodes may apply thresholds in order to determine whether, or when, to provide output to a connected node. The output of each node may be calculated as a non-linear function of a sum of the inputs to the node. The neural network 406 may include any number of nodes and any type of connections between nodes. The neural network 406 may include one or more hidden nodes. Nodes may be aggregated into layers, and different layers of the neural network may perform different kinds of transformations on the input. A signal may travel from input at a first layer through the multiple layers of the neural network to output at a last layer of the neural network and may traverse layers multiple times. As an example, the first wireless device 402 may input information 410 to the neural network 406 (e.g., via a task/condition manager 418), and may receive output 412 (e.g., via a controller/processor 420). The first wireless device 402 may report information 414 to the second device 404 based on the output 412. In some aspects, the second device may transmit communication to the first wireless device 402 based on the information 414. In some aspects, the second device 404 may be a base station that schedules or configures a UE (e.g., the first wireless device 402) based on the information 414, e.g., at 416. In other aspects, the base station may collect information from multiple training hosts, e.g., from multiple UEs. Similarly, a network may collect information from multiple training hosts including multiple base stations, multiple IAB nodes, and/or multiple UEs, among other examples.

The first wireless device 402 may be configured to perform aspects in connection with the model combination component 198 of FIG. 1. For example, the first wireless device 402 may be a first UE or a network component that includes the model combination component 198 of FIG. 1, one or more backbone/general blocks 702, and one or more specific/dedicated block(s) 704*a*-704*b* (described in further detail in FIG. 7). The model combination component 198 may be configured to combined the backbone/general block 702 with one or more specific/dedicated block(s) 704*a*-704*b* to generate a combined ML model.

The second wireless device 404 may be configured to perform aspects in connection with the ML capability component 199 of FIG. 1. For example, the second wireless device 404 may be a network or a second UE that includes the ML capability component 199 of FIG. 1, one or more backbone/general blocks 702, and one or more specific/dedicated block(s) 704*a*-704*b* (described in further detail in FIG. 7). The ML capability component 199 may be configured to determine, based on a UE capability, a combination between the backbone/general block 702 and the one or more specific/dedicated block(s) 704*a*-704*b* for configuring the backbone/general block 702 and the one or more specific/dedicated block(s) 704*a*-704*b* to the first wireless device 402.

Figure 5:
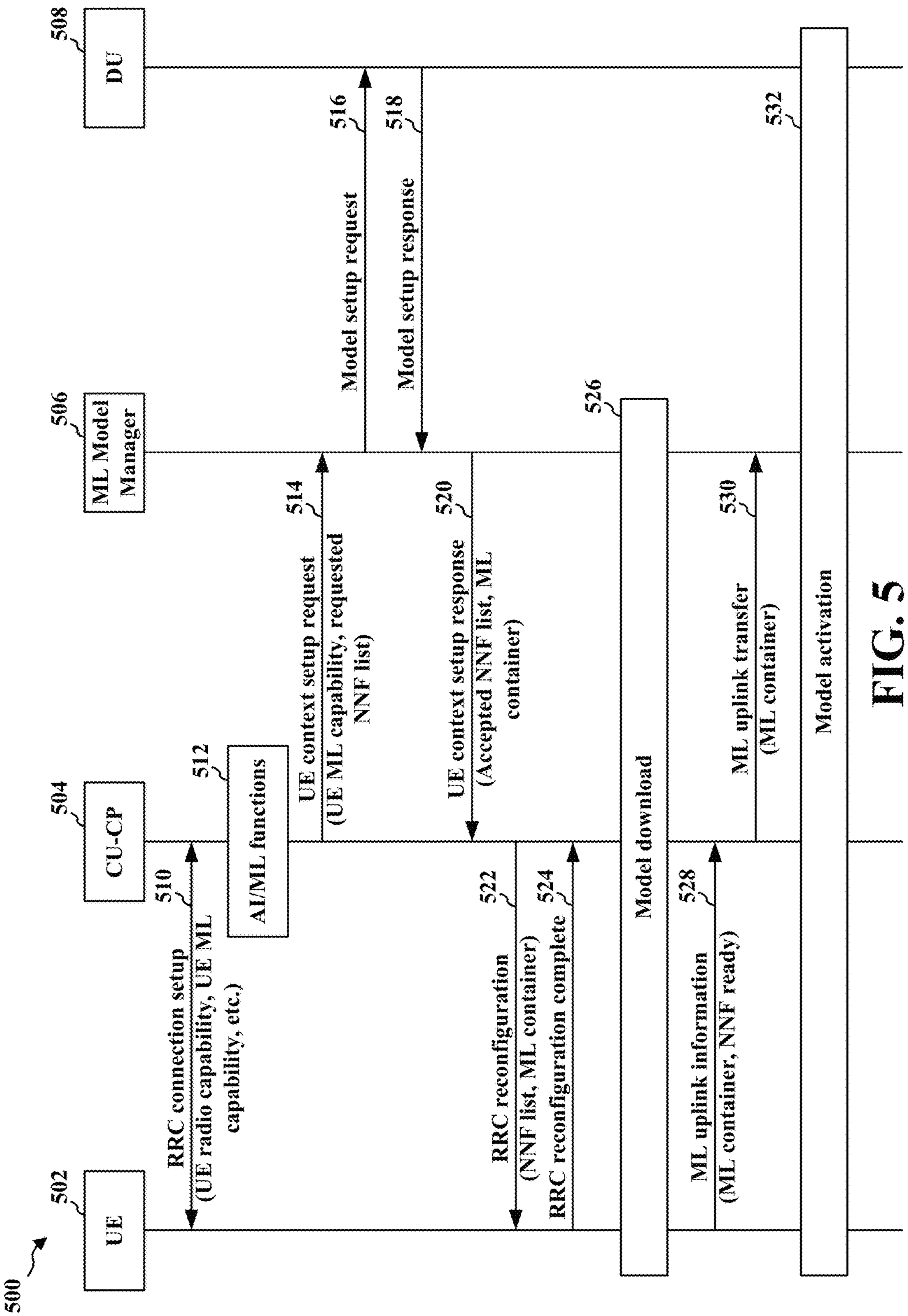
FIG. 5 is a call flow diagram illustrating communications between a UE and a network.

FIG. 5 is a call flow diagram 500 illustrating communications between a UE 502 and a network including a centralized unit-control plane (CU-CP) 504, a machine learning (ML) model manager 506, and a distributed unit (DU) 508. ML model inferencing techniques may be associated with deployment and configuration of an ML model via a three-phase procedure. In a first phase of the three-phase procedure, an RRC connection may be established between the UE 502 and the network (e.g., CU-CP 504) to provide a configuration for the ML model deployment. For example, the UE 502 may perform, at 510, an RRC connection setup with the CU-CP 504. The RRC connection setup, at 510, may be indicative of a UE radio capability, a UE ML capability, etc.

The CU-CP 504 may be configured to utilize, at 512, artificial intelligence (AI)/ML capabilities for one or more AI/ML functions at the CU-CP 504. The AI/ML functions 512 may correspond to any of the techniques described in connection with FIG. 4 and/or other AI/ML techniques. The CU-CP 504 may transmit, at 514, a UE context setup request to the ML model manager 506. The transmitted request may be indicative of the UE ML capability, a requested neural network filtering (NNF) list, etc. The ML model manager 506 may transmit, at 516, a model setup request to the DU 508 based on the UE context setup request received, at 514, from the CU-CP 504. In response to the model setup request, the DU 508 may transmit, at 518, a model setup response to the ML model manager 506. The ML model manager 506 may similarly transmit, at 520, a UE context setup response to the CU-CP 504 based on the model setup response received, at 518, from the DU 508. The UE context setup response may be indicative of an accepted NNF list, an ML container, etc.

The CU-CP 504 may transmit, at 522, an RRC reconfiguration to the UE 502 based on the UE context setup response received, at 520, from the ML model manager 506. The RRC reconfiguration may be indicative of the NNF list, the ML container, etc. Responsive to receiving the RRC reconfiguration, at 522, the UE 502 may transmit, at 524, an RRC reconfiguration complete message to the CU-CP 504 to indicate that the RRC connection has been established between the UE 502 and the network.

A second phase of the three-phase procedure may correspond to an ML model download procedure. The network may configure one or more ML models at a designated node in the network, such as at the ML model manager 506. The UE 502 may download, at 526, the one or more ML models from the designated node in the network (e.g., from the ML model manager 506 via the CU-CP 504).

A third phase of the three-phase procedure may correspond to an ML model activation procedure. The downloaded ML model may be used by the UE 502 in association with performing a particular task. The UE 502 may transmit, at 528, ML uplink information to the CU-CP 504 such as the ML model container, an NNF ready indication, etc. The CU-CP 504 may subsequently transmit, at 530, an ML uplink transfer indication (e.g., ML container) to the ML model manager 506 for performing, at 532, ML model activation among the UE 502 and the nodes of the network.

Figure 6:
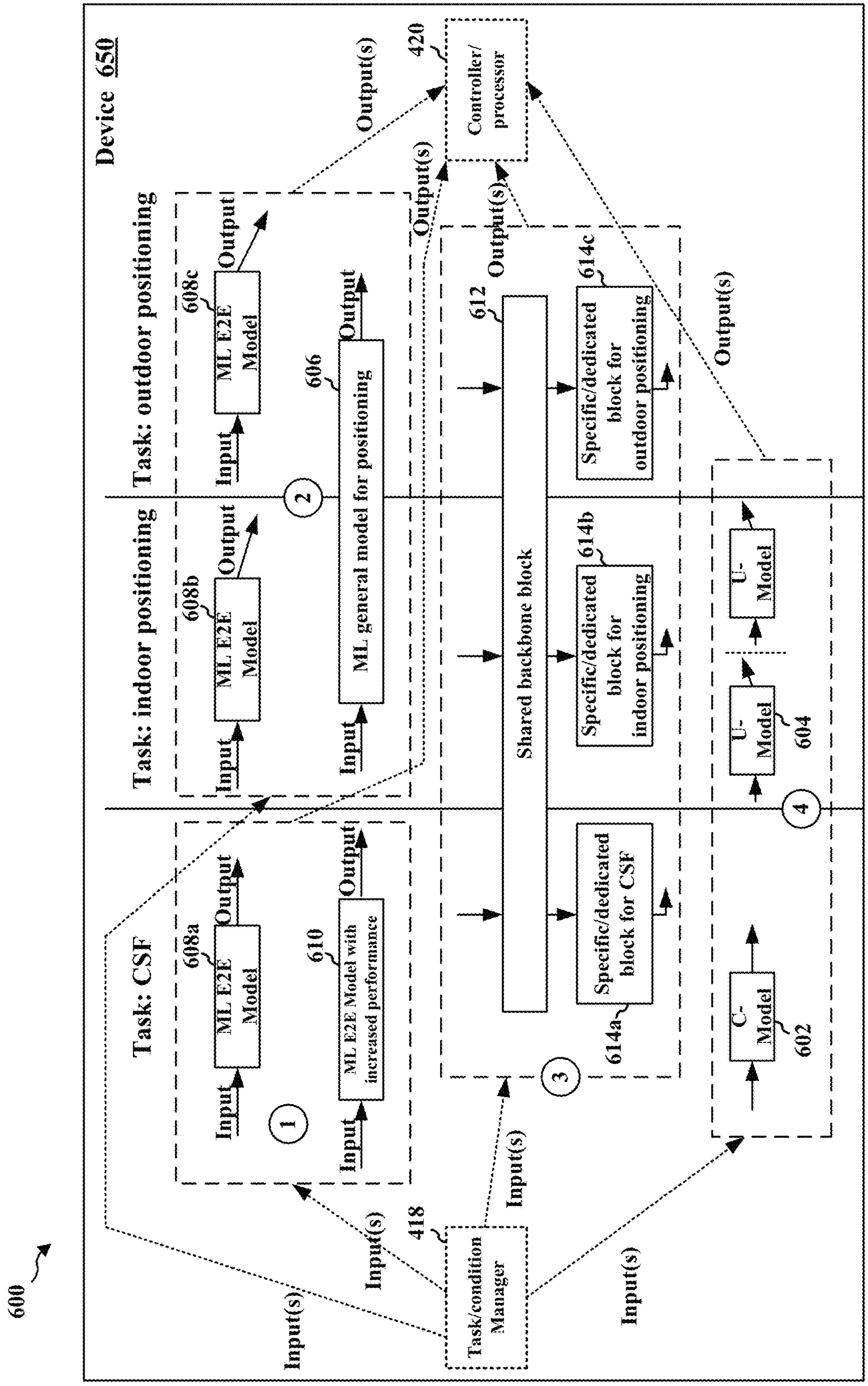
FIG. 6 illustrates an example diagram including different types of machine learning (ML) model structures.

FIG. 6 illustrates an example diagram 600 including different types of ML model structures for a device 650. The device 650 may be a UE, a base station, other network entity, etc. Different ML models may be configured for performing different conditions/tasks associated with wireless communication. The different conditions/tasks may include aspects related to high Doppler, low speeds, indoor/outdoor environments, etc., which may each correspond to different ML models. For example, a cell-specific model 602 may be configured for different cells or cell groups (e.g., a particular cell-specific model may be configured for a particular cell/cell group). A UE-specific model 604 may be similarly configured for different UEs or UE groups (e.g., a particular UE-specific model may be configured for a particular UE/UE group). In addition to the cell-specific/UE-specific models 602-604, a general ML model 606 may be configured in association with non-cell-specific and non-UE-specific conditions. For example, the general ML model 606 may be configured for performing a positioning task based on all of the high Doppler, low speeds, indoor/outdoor environments, etc.

In some cases, a plurality of models may be configured for a same task/condition (e.g., indoor channel state feedback (CSF)) to provide a range of granularity and performance levels. For example, two ML models may be configured for CSF in association with one/same condition. A first of the two ML models (e.g., an enhanced ML end-to-end (E2E) model 610) may include a large computational cost, but may provide a better performance, whereas a second of the two ML models (e.g., a first E2E model 608*a*) may be similar to the general ML model 606 that is more robust and supports a plurality of different tasks/conditions. An overall complexity of the first E2E model 608*a* may be less than a complexity of the enhanced E2E model 610, but a resulting performance of the first E2E model 608*a* may also be less than a performance of the enhanced E2E model 610.

Configured ML models may be associated with different model structures. For example, a first model structure may correspond to an ML E2E model 608*a*-608*c* executed for one task in one condition. A second model structure may correspond to a combined model including a general block and a specific block. The general block may also be referred to as a "backbone" block. The specific block may also be referred to as a "dedicated" block. A backbone block 612 may be shared among different UEs/different cells to be used for performing a plurality of different tasks/conditions. A specific/dedicated block (e.g., specific/dedicated blocks 614*a*-614*c*) may be dedicated to performing a particular task/condition.

The UE may be configured with a plurality of ML models to perform a same task at different performance levels. In a first aspect associated with a task for CSF, the UE may be configured with two models. A first model may correspond to the first ML E2E model 608*a*. A second model may correspond to the enhanced ML E2E model 610 having high complexity and increased performance for the same task (e.g., the CSF task). The first ML E2E model 608*a* and the enhanced ML E2E model 610 may be associated with a same input (e.g., an input from the task/condition manager 418), but generate respective output (e.g., outputs provided to the controller processor 420).

In a second aspect, separate ML E2E models (e.g., a second ML E2E model 608*b* and a third ML E2E model 608*c*) may be used for separate tasks of a same condition. For example, the condition may correspond to UE positioning, and the separate tasks of the condition may correspond to an indoor positioning task and an outdoor positioning task. In another example, the condition may correspond to a CSF measurement, and the separate tasks of the condition may correspond to CSF per BWP task, a CSF in high Doppler task, and a CSF with decreased feedback task. In yet another example, the condition may correspond to data decoding, and the separate tasks of the condition may correspond to a decoding task in a low signal-to-ratio (SNR), a decoding task in a high SNR, and a decoding per base graph (BG) task. While the foregoing tasks/conditions are described for exemplary purpose, ML models may be used in association with any other tasks/conditions of a device. Thus, two separate ML E2E models (e.g., the second ML E2E model 608*b* and the third ML E2E model 608*c*) may be used for the indoor positioning and the outdoor positioning. The general ML model 606 may also be configured for the positioning task, where the general ML model 606 may be used for both the indoor positioning and the outdoor positioning. The general ML model 606 may have a lower computational cost than the second ML E2E model 608*b* and the third ML E2E model 608*c* that are respectively configured for the indoor positioning and the outdoor positioning, but may also provide decreased performance in comparison to the second ML E2E model 608*b* and the third ML E2E model 608*c*.

In a third aspect, for different tasks and conditions, such as the CSF task and the indoor/outdoor positioning task, a same backbone block 612 may be shared across models. A specific/dedicated block for each of the tasks/conditions may be combined with the shared backbone block 612 to perform the different tasks/conditions. For example, a first specific/dedicated block 614*a* for the CSF task may be configured and combined with the backbone block 612 to perform the CSF task, a second specific/dedicated block 614*b* for the indoor positioning task may be configured and combined with the backbone block 612 to perform the indoor positioning task, and a third specific/dedicated block 614*c* for the outdoor positioning task may be configured and combined with the backbone block 612 to perform the outdoor positioning task. The backbone block 612 may be combined with each of the specific/dedicated blocks 614*a*-614*c* to provide respective ML E2E models, which may be referred to herein as combined ML models. That is, a combined ML model includes at least one backbone block 612 and at least one specific/dedicated block 614*a*-614*c*. In a fourth aspect, the ML model may correspond to a cell-specific model 602 (e.g., C-model) or a UE-specific model 604 (e.g., U-model). Input(s) for different aspects of the device 650 may be received from the task/condition manager 418 and output(s) from the different aspects of the device 650 may be provided to the controller/processor 420.

Figure 7:
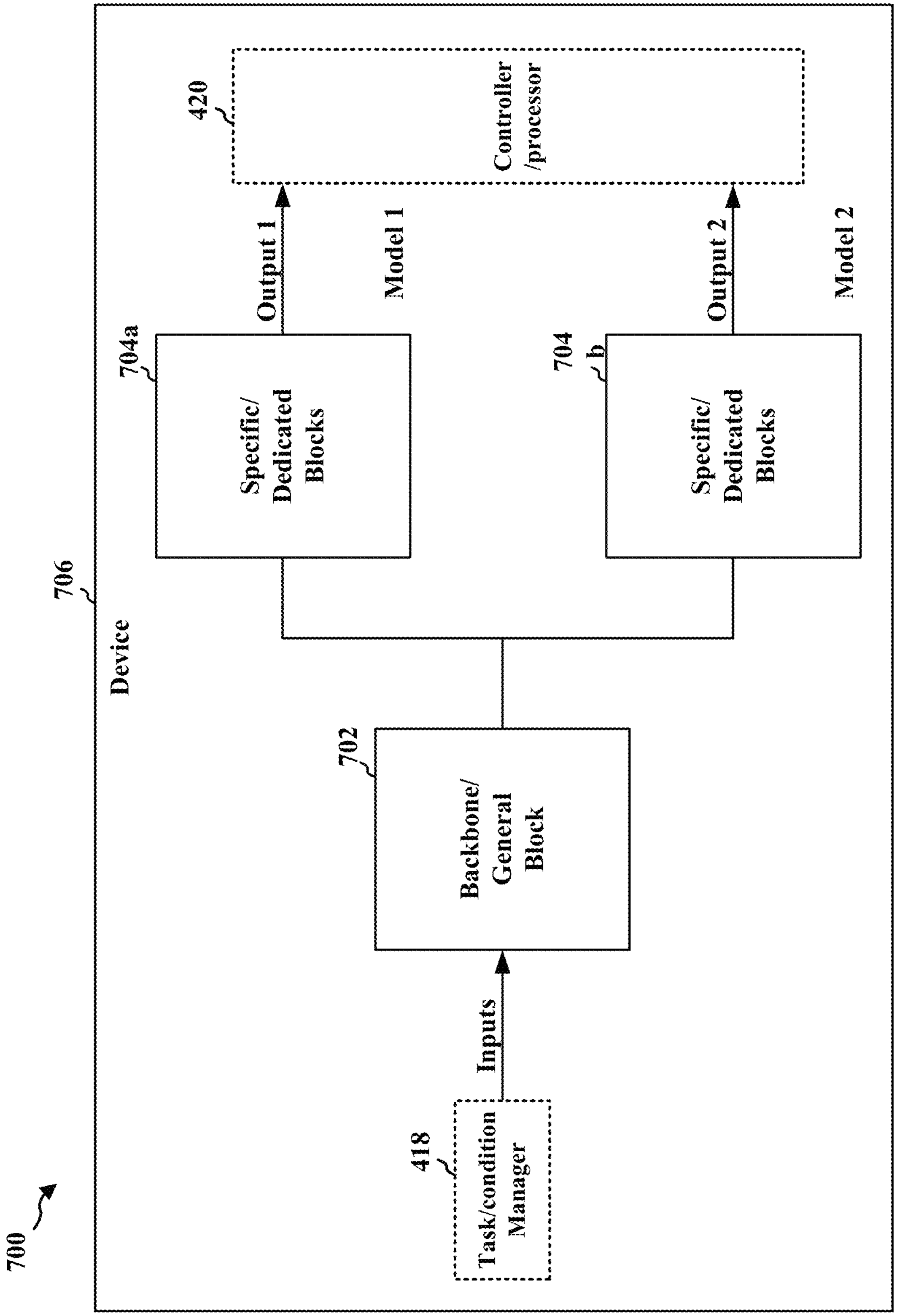
FIG. 7 is a diagram illustrating inputs and outputs for a plurality of combined ML models.

FIG. 7 is a diagram 700 that illustrates inputs and outputs for a plurality of combined ML models executed by a device 706. The device 706 may be a UE, a base station, other network entity, etc. The plurality of combined ML models may be configured to share a same backbone/general block 702, but have separate specific/dedicated blocks 704*a*-704*b*. The backbone/general block 702 and the specific/dedicated blocks 704*a*-704*b* may be included at a same device. The plurality of combined ML models may correspond to a first model/model 1 and a second model/model 2, where both the first model and the second model receive inputs at the backbone/general block 702 (e.g., from the task/condition manager 418), but the first model provides a first output/output 1 from a first specific/dedicated block 704*a* (e.g., to the controller/processor 420) and the second model provides a second output/output 2 from a second specific/dedicated block 704*b* (e.g., to the controller/processor 420). The backbone/general block 702 may be based on a periodic configuration or a static configuration. The specific/dedicated blocks 704*a*-704*b* in the combined ML models may then be updated or changed for adapting the combined ML models to different tasks and conditions. Configuring combined ML models based on a shared backbone/general block 702 may provide reduced signaling cost.

The network may separately configure the two blocks of the combined ML model to the UE. That is, the network may configure the backbone/general block 702 to the UE separately from configuring the specific/dedicated blocks 704*a*-704*b* to the UE. For example, the backbone/general block 702 may be initially configured to the UE but, based on different tasks/conditions, the network may determine to configured the one or more specific/dedicated blocks 704*a*-704*b* to the UE. Parameters used for the configured blocks of a combined ML model may also be signaled separately to the UE. The parameters may be associated with information indicative of the combined model. For example, the parameters may be indicative of an association between the backbone/general block 702 and the specific/dedicated blocks 704*a*-704*b* for generating the combined ML model.

As different blocks may be configured to the UE to generate different combined ML models, the network may have to select an ML block combination based on a determined task/condition, configure the ML blocks to the UE for the determined task/condition, and/or determine a balance between complexity and performance for the determined task/condition. Thus, the signaling to the UE may be based on procedures and/or protocols for combined ML model configuration and activation. The signaling for the combined ML model may be used to provide model combinations that balance model performance with model complexity. For example, the combined ML model may be based on configured backbone block parameters, configured specific/dedicated block parameters, a UE capability for the combined ML model configuration, association protocols for between the backbone/general block 702 and the specific/dedicated blocks 704*a*-704*b*, model switching techniques, etc.

FIG. 8 is a table 800 indicative of example backbone block parameters. Backbone block parameters may be configured separately from specific/dedicated block parameters. A configuration for the backbone block may include one or more backbone block parameters. For example, as indicated in the table 800, the configuration including the backbone block parameters may include at least 4 parameters. The backbone block may also include a plurality of layers, such as a convolution layer, a fully connected (FC) layer, a pooling layer, an activation layer, and/or other types of layers.

The backbone block may be configured for a particular domain in association with the configured parameters. A first parameter may correspond to a backbone block ID, which may be indicative of an index to different ML backbone blocks. The backbone block ID may also be associated with an application domain. For example, "darknet" may be used for an image/video domain application. The backbone block may be arranged at a beginning/first portion of the combined ML model. In such cases, an input to the backbone block may correspond to an input of the combined ML model. A second parameter may correspond to an input format, which may be indicative of a type of input format to be received by the combined ML model. For example, for channel estimation, a backbone block input format may be 256×16×2, where 256 corresponds to a number of time samples, 16 corresponds to a number of REs, and 2 corresponds to both real and imaginary values. The backbone block input format may also be a combined ML model input format.

A third parameter may correspond to a timer parameter. The timer parameter may be indicative of an available time for the backbone block to execute. A fourth parameter may correspond to a BWP ID. The BWP ID may be indicative of an available BWP index for the backbone block. Other backbone block parameters may also be configured to the UE in addition to, or alternatively to, one or more of the backbone block parameters indicated in the table 800. Further, the parameter names associated with the functions of the parameters included in the table 800 may be referred to by other names.

FIG. 9 is a table 900 indicative of example specific/dedicated block parameters. The specific/dedicated block parameters may be configured separately from the backbone block parameters. A configuration for the specific/dedicated block(s) may include one or more specific/dedicated parameters. For example, as indicated in the table 900, the configuration including the specific/dedicated block parameters may include at least 8 parameters, which may be used to configure one specific/dedicated block.

A first parameter may correspond to a specific/dedicated block ID, which may be indicative of an index to different ML specific/dedicated blocks. A second parameter may correspond to a timer parameter. The timer parameter may be indicative of an available time for the specific/dedicated block to execute, and may be associated with the same information as the timer parameter for the backbone block. A third parameter may correspond to a backbone block ID, which may indicate an associated backbone block/general model. The backbone block ID parameter for the specific/dedicated blocks may correspond to the backbone block ID parameter for the backbone blocks, since the specific/dedicated blocks may be combined with a backbone block. The backbone block ID may also be indicative of an association between the backbone block and the specific/dedicated block for generating the combined ML model.

A fourth parameter may correspond to a task ID. The task ID may be indicative of a task for which the specific/dedicated block is to be applied. That is, the task ID may indicate a particular combination between at least one of the specific/dedicated blocks and at least one of the backbone blocks to provide the combined ML model. The specific/dedicated block may be configured for one particular task. Thus, a particular output format of the specific/dedicated block may be utilized in association with the particular task. Hence, a fifth parameter may correspond to an output format indicative of the output format of the combined ML model. The input format parameter for the specific/dedicated block may correspond to the output format parameter for the backbone block. While the backbone block may be arranged at a beginning/first portion of the combined ML model, the specific/dedicated block may be arranged at an end/second portion of the combined ML model. Thus, an input format to the specific/dedicated block may be an output format of the backbone block. The output of the specific/dedicated block may correspond to an output of the combined ML model.

A sixth parameter may correspond to a specific/dedicated block type, which may be indicative of a UE-specific block or a cell-specific block (e.g., for a group of UEs). Similar to the backbone block, the specific/dedicated block may include a plurality of layers. A seventh parameter may correspond to a condition ID, which may be indicative of a condition for enabling the combined ML model. For example, the condition ID may indicate a condition for which the specific/dedicated block is to be executed. An eighth parameter may correspond to a granularity of the specific/dedicated block, which may be indicative of a performance level of the combined ML model. Other specific/dedicated block parameters may also be configured to the UE in addition to, or alternatively to, one or more of the specific/dedicated block parameters indicated in the table 900. Further, the parameter names associated with the functions of the parameters included in the table 900 may be referred to by other names.

Referring again to the diagram 500 of FIG. 5, a UE capability may be indicated, at 510, for receiving, at 522, the combined ML model configuration. For example, the UE capability may be associated with a higher layer configuration for the UE 502 and may be indicative of an ML processing capability of the UE 502. In a first example, a number of indications may be included in a UE capability report. For instance, the UE capability report may indicate a maximum number of specific/dedicated blocks per BWP to be configured to the UE 502. The UE capability report may also indicate a maximum number of specific/dedicated blocks per slot to be configured to the UE 502. The UE capability report may further indicate a maximum number of backbone blocks to be configured to the UE 502. The UE capability report may still further indicate a maximum number of ML models that may be executed simultaneously at the UE 502. In cases where the combined ML model includes a shared backbone block configuration, the number of combined ML models may be equal to the number of specific/dedicated blocks.

In a second example, the UE capability for the combined ML model configuration may be based on one or more predetermined protocols. That is, predetermined values may be predefined for various aspects associated with the UE capability and/or the combined ML model. For example, the predetermined protocols/values may indicate that the maximum number of specific/dedicated blocks per BWP is equal to 10, and the maximum number of backbone blocks per BWP is equal to 3. The network and the UE 502 may perform processing techniques based on the predetermined protocols/values. Thus, the UE 502 may not have to transmit, at 510, a UE capability report to the CU-CP 504.

UE ML capability reporting may be signaled, at 510, to the network during an RRC connection setup. For example, the UE 502 may report, at 510, the UE radio capability, the UE ML capability, etc., to the CU-CP 504. The UE 502 may also report (e.g., at 510) a capability for a maximum number of backbone blocks and a capability for a maximum number of specific/dedicated blocks. The ML model manager 506 may configure the corresponding ML models based on the task/condition of the UE 502 and the UE capability reporting. The UE ML capability, the requested model list, etc., may be communicated, at 514, to the ML model manager 506 during the UE context setup. The ML model manager 506 may configure the ML model based on the task/condition of the UE 502 and the UE capability reporting, such that the UE 502 may download, at 526, the ML model. Based on the UE capability, a number of general models and a number of specific/dedicated models may be configured at an acceptable download cost to the UE 502. The UE 502 may perform, at 532, model activation for an application of the ML model after downloading, at 526, the ML model from the network.

The UE capability reporting may also be indicative of the maximum number of backbone blocks. In an example, a predefined protocol may limit the maximum number of backbone blocks to 3 backbone blocks, in which case no more than 3 active backbone blocks may be available to the UE 502 at a same time. Further, the specific/dedicated blocks configured to the UE 502 may be limited to the specific/dedicated blocks that are associated with the 3 available backbone blocks. That is, the UE 502 may not be configured with specific/dedicated blocks that are not to be combined with the 3 available backbone blocks (e.g., based on the backbone block index). Both the UE configuration cost and the association complexity between the backbone blocks and the specific/dedicated blocks may be reduced based on such techniques.

The UE 502 may determine an association between the backbone blocks and the specific/dedicated blocks after the blocks are defined by the network. In a first aspect, the network may indicate the specific/dedicated blocks for an application, but not indicate the backbone blocks, as the specific/dedicated block parameter configuration (e.g., associated with the table 900) may include a backbone block ID for indexing to an associated backbone block. Thus, after the specific/dedicated blocks are indicated and configured to the UE 502, the specific/dedicated block parameter configuration may provide the corresponding association to the backbone blocks. Accordingly, the UE 502 may identify the backbone block index and determine the association between the specific/dedicated blocks and the backbone blocks.

In a second aspect, the network may indicate the specific/dedicated blocks to the UE 502 and configure the UE 502 with the associated backbone block index. For example, the network may configure the UE 502 with the associated backbone block index if the specific/dedicated block parameter configuration does not include a backbone block index parameter. The network may also configure the UE 502 with the associated backbone block index based on an update to the specific/dedicated block parameter. The associated backbone block index may be included in the specific/dedicated block indication. In other cases, the network may indicate the specific/dedicated block index and the backbone block index (e.g., via separate indications including a first indication for the specific/dedicated block and a second indication for the backbone block). The configurations for the specific/dedicated block and the backbone block may be preconfigured based on an RRC message. Both the individual indication of the specific/dedicated block index and the separate indications of both the specific/dedicated block index and the backbone index may be indicated to the UE 502 via DCI, MAC-control element (MAC-CE), or RRC signaling.

The UE 502 may perform a model switching procedure between different ML models. For example, the UE 502 may switch from a general model having increased robustness to an enhanced model, such as a specific/dedicated model, that may include increased performance but may also have increased complexity. Model switching may be performed to adapt to different tasks/conditions of the UE 502. The network may indicate the model switching procedure to the UE 502 based on bits that are signaled to the UE 502. For example, if the ML model is associated with two configurations, bit 1 may indicate to the UE 502 to switch the model, whereas bit 0 may indicate to the UE 502 to maintain a previous model. The network may alternatively indicate an index to the model that is to be deployed at the UE 502, and the UE 502 may use/switch to the model associated with the index. Further, the UE 502 may be configured to switch models based on one or more predefined protocols and indicate the switch to the network. For example, if model performance may be low for a particular task/condition, the UE 502 may switch to a general model and report the switch to the network on uplink. Model switching indications may be provided via DCI, MAC-CE, or RRC signaling.

Figure 10:
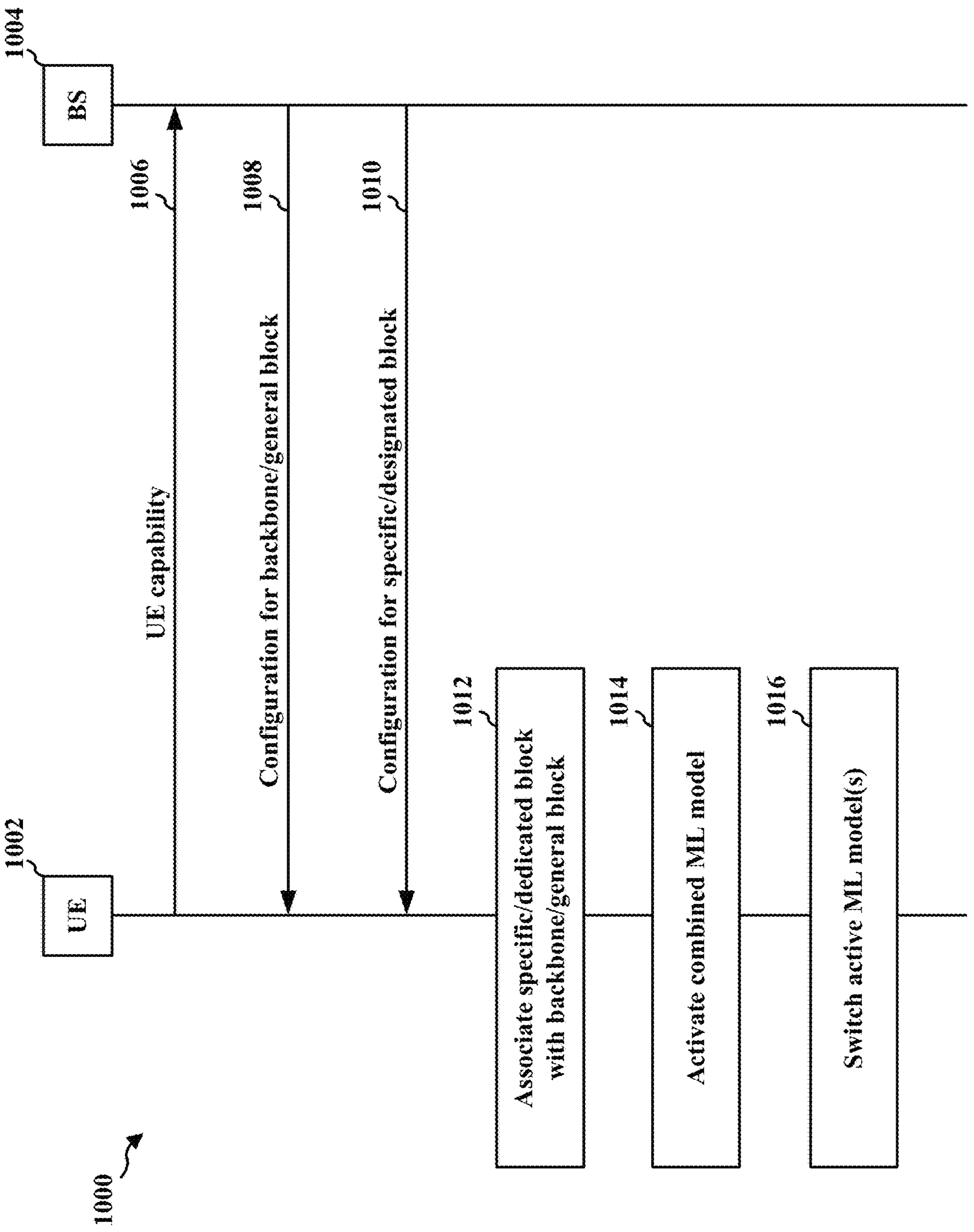
FIG. 10 is a call flow diagram illustrating communications between a UE and a base station.

FIG. 10 is a call flow diagram 1000 illustrating communications between a UE 1002 and a base station 1004. At 1006, the UE 1002 may report a UE capability to the base station 1004. The UE capability may be indicative of a UE ML capability for associating a specific/dedicated block with a backbone/general block to provide a combined ML model.

At 1008, the base station 1004 may transmit, to the UE 1002, a configuration for the backbone/general block. In examples, the backbone/general block may be configured based on one or more of the parameters included in the table 800 (e.g., backbone block ID, timer, input format, and/or BWP ID). At 1010, the base station 1004 may transmit, to the UE 1002, a configuration for the specific/dedicated blocks. In examples, the specific/dedicated blocks may be configured based on one or more of the parameters included in the table 900 (e.g., dedicated block ID, timer, backbone block ID, task ID, output format, dedicated block type, condition ID, and/or granularity). The configurations transmitted, at 1008-1010, to the UE 1002 may be based on the UE capability indicating that the UE 1002 is able to associate the specific/dedicated blocks with the backbone/general blocks to provide the combined ML model.

At 1012, the UE 1002 may associate the specific/dedicated block (e.g., configured to the UE 1002, at 1010) with the backbone/general block (e.g., configured to the UE 1002, at 1008). At 1014, the UE 1002 may activate the combined ML model based on performing the association, at 1012, of the specific/dedicated block configured, e.g., based on one or more of the parameters included in the table 900, with the backbone/general block configured, e.g., based on one or more of the parameters included in the table 800.

The UE 1002 may be configured with a plurality of ML models based on an ML model complexity and a performance level of the UE 1002 associated with the ML model complexity. The combined ML model activated, at 1014, by the UE 1002 may be one of the plurality of ML models configured to the UE 1002. At 1016, the UE 1002 may determine to switch active ML model(s). For example, the UE 1002 may switch from a first ML model, such as the combined ML model activated at 1014, to a second ML model that is different from the first ML model.

Figure 11:
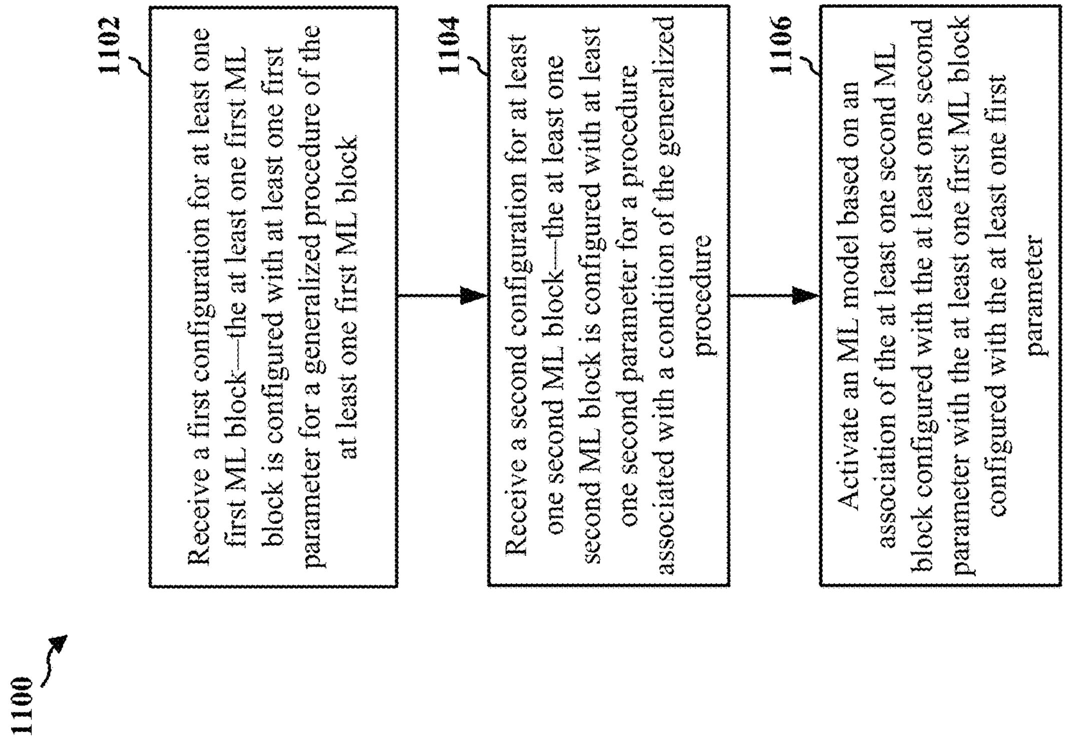
FIG. 11 is a flowchart of a method of wireless communication at a UE.

FIG. 11 is a flowchart 1100 of a method of wireless communication. The method may be performed by a UE (e.g., the UE 104, 402, 502, 1002; the apparatus 1402; etc.), which may include the memory 360 and which may be the entire UE 104, 402, 502, 1002 or a component of the UE 104, 402, 502, 1002, such as the TX processor 368, the RX processor 356, and/or the controller/processor 359. The method may be performed to balance ML model performance with ML model complexity.

At 1102 the UE may receive a first configuration for at least one first ML block—the at least one first ML block is configured with at least one first parameter for a generalized procedure of the at least one first ML block. For example, referring to FIGS. 6-8 and 10, the UE 1002 may receive, at 1008 from the base station 1004, a configuration for a backbone/general block, which may correspond to the backbone/general block 702, the shared backbone block 612, etc. The configuration received, at 1008 from the base station 1004, for the backbone/general block may be based on one or more parameters indicated in the table 800. The reception, at 1102, may be performed by the reception component 1430 of the apparatus 1402 in FIG. 14.

At 1104, the UE may receive a second configuration for at least one second ML block—the at least one second ML block is configured with at least one second parameter for a procedure associated with a condition of the generalized procedure. For example, referring to FIGS. 6-8 and 10, the UE 1002 may receive, at 1010 from the base station 1004, a configuration for a specific/dedicated block, which may correspond to the specific/dedicated blocks 614*a*-614*c*, 704*a*-704*b*, etc. The configuration received, at 1010 from the base station 1004, for the specific/dedicated block may be based on one or more parameters indicated in the table 900. The reception, at 1104, may be performed by the reception component 1430 of the apparatus 1402 in FIG. 14.

At 1106, the UE may activate an ML model based on an association of the at least one second ML block configured with the at least one second parameter with the at least one first ML block configured with the at least one first parameter. For example, referring to FIGS. 5 and 8-10, the UE 1002 may activate, at 1014, a combined ML model based on the association, at 1012, of the specific/dedicated block (e.g., configured, at 1010, based on the table 900) with the backbone/general block (e.g., configured, at 1008, based on the table 800). Similarly, the UE 502 may perform, at 532, model activation based on the ML model that is downloaded, at 526, from the network. The activation, at 1106, may be performed by the activation component 1444 of the apparatus 1402 in FIG. 14.

Figure 12:
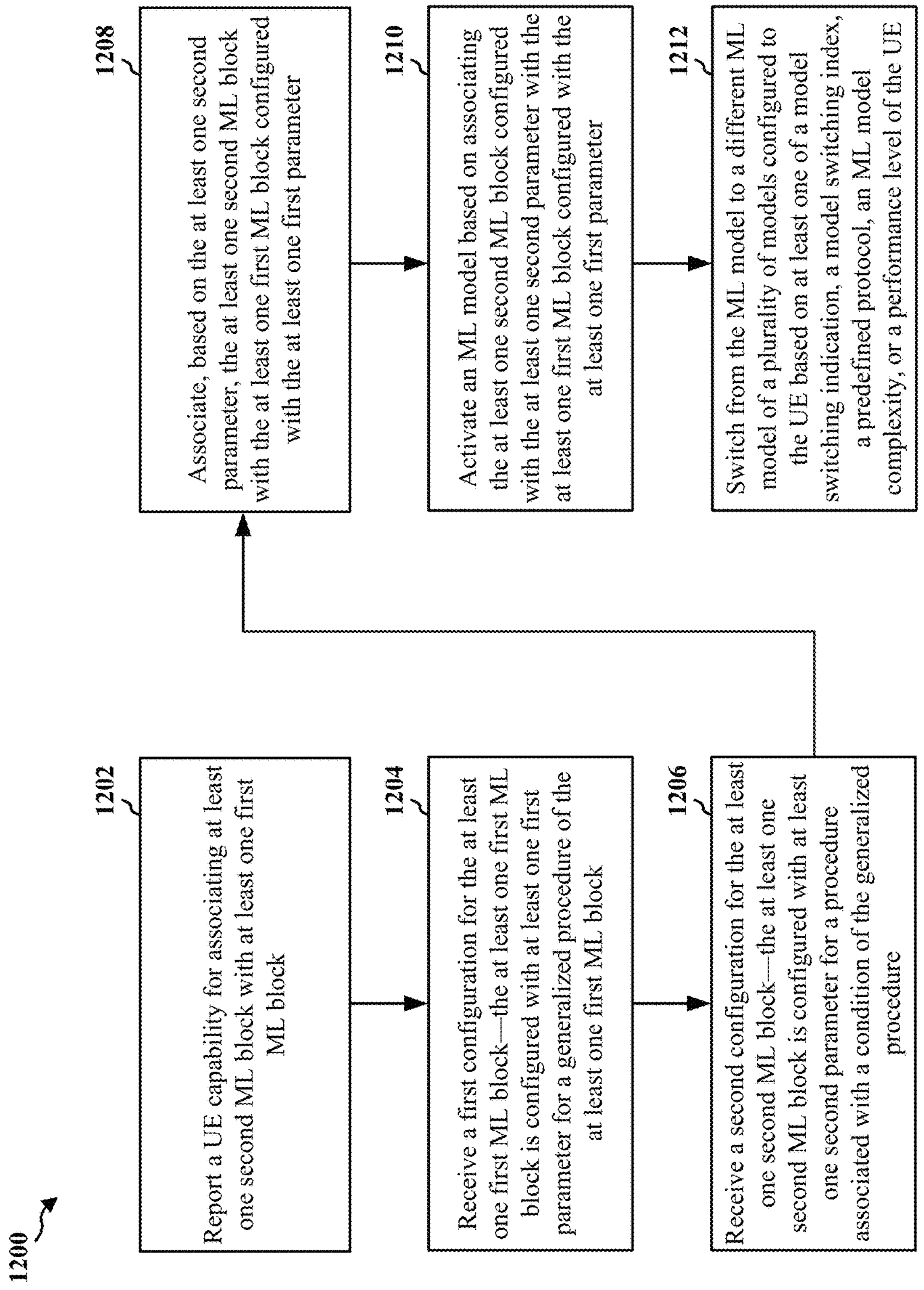
FIG. 12 is a flowchart of a method of wireless communication at a UE.

FIG. 12 is a flowchart 1200 of a method of wireless communication. The method may be performed by a UE (e.g., the UE 104, 402, 502, 1002; the apparatus 1402; etc.), which may include the memory 360 and which may be the entire UE 104, 402, 502, 1002 or a component of the UE 104, 402, 502, 1002, such as the TX processor 368, the RX processor 356, and/or the controller/processor 359. The method may be performed to balance ML model performance with ML model complexity.

At 1202, the UE may report a UE capability for associating at least one second ML block with at least one first ML block. For example, referring to FIGS. 5 and 10, the UE 1002 may report, at 1006, a UE capability to the base station 1004. The UE 502 may also report, at 510, a UE radio capability, a UE ML capability, etc., to the CU-CP 504 in an RRC connection setup message. The UE capability reported, at 510/1004, may be indicative of at least one of a first maximum number of first ML blocks, a second maximum number of second ML blocks per BWP, a third maximum number of second ML blocks per slot, or a fourth maximum number of simultaneously activate ML models. The reporting, at 1202, may be performed by the reporter component 1440 of the apparatus 1402 in FIG. 14.

At 1204, the UE may receive a first configuration for the at least one first ML block—the at least one first ML block is configured with at least one first parameter for a generalized procedure of the at least one first ML block. For example, referring to FIGS. 6-8 and 10, the UE 1002 may receive, at 1008 from the base station 1004, a configuration for a backbone/general block, which may correspond to the backbone/general block 702, the shared backbone block 612, etc. The configuration received, at 1008 from the base station 1004, for the backbone/general block may be based on one or more parameters indicated in the table 800. For example, the at least one first parameter may correspond to one or more of a backbone block ID, a timer, an input format, or a BWP ID, as indicated in the table 800. The reception, at 1204, may be performed by the reception component 1430 of the apparatus 1402 in FIG. 14.

At 1206, the UE may receive a second configuration for the at least one second ML block—the at least one second ML block is configured with at least one second parameter for a procedure associated with a condition of the generalized procedure. For example, referring to FIGS. 6-8 and 10, the UE 1002 may receive, at 1010 from the base station 1004, a configuration for a specific/dedicated block, which may correspond to the specific/dedicated blocks 614*a*-614*c*, 704*a*-704*b*, etc. The configuration received, at 1010 from the base station 1004, for the specific/dedicated block may be based on one or more parameters indicated in the table 900. For example, as indicated in the table 900, the at least one second parameter may correspond to one or more of a specific/dedicated block ID, a timer, a backbone block ID, a task ID, an output format, a specific/dedicated block type, a condition ID, a performance level granularity, or an index to the at least one first parameter. The reception, at 1206, may be performed by the reception component 1430 of the apparatus 1402 in FIG. 14.

At 1208, the UE may associate, based on the at least one second parameter, the at least one second ML block with the at least one first ML block configured with the at least one first parameter. For example, referring to FIGS. 8-10, the UE 1002 may associate, at 1012, a specific/dedicated block with a general/backbone block based on the configurations received, at 1008 and/or 1010. For example, the UE 1002 may associate the at least one second block with the at least one first block based on the backbone block ID parameter indicated in table 800 and/or table 900. The association, at 1208, may be performed by the association component 1442 of the apparatus 1402 in FIG. 14.

At 1210, the UE may activate an ML model based on associating the at least one second ML block configured with the at least one second parameter with the at least one first ML block configured with the at least one first parameter. For example, referring to FIGS. 5-10, the UE 1002 may activate, at 1014, a combined ML model based on the association, at 1012, of the specific/dedicated block (e.g., configured, at 1010, based on the table 900) with the backbone/general block (e.g., configured, at 1008, based on the table 800). Similarly, the UE 502 may perform, at 532, model activation based on the ML model that is downloaded, at 526, from the network. The at least one first ML block may correspond to a backbone block (e.g., the backbone/general block 702, the shared backbone block 612, etc.) and the at least one second ML block corresponds to a dedicated block (e.g., the specific/dedicated blocks 614*a*-614*c*, 704*a*-704*b*, etc.). The association, at 1012, of the at least one second ML block (e.g., the specific/dedicated blocks 614*a*-614*c*, 704*a*-704*b*, etc.) with the at least one first ML block (e.g., the backbone/general block 702, the shared backbone block 612, etc.) may be based on at least one of a predefined protocol, a first indication of the at least one first ML block, a second indication of the at least one second ML block, a first index to the at least one first ML block, or a second index to the at least one second ML block. The at least one first ML block (e.g., the backbone/general block 702, the shared backbone block 612, etc.) and the at least one second ML block (e.g., the specific/dedicated blocks 614*a*-614*c*, 704*a*-704*b*, etc.) may each include one or more layers. The one or more layers may include at least one of a convolution layer, an FC layer, a pooling layer, or an activation layer. The association, at 1012, of the at least one second ML block (e.g., the specific/dedicated blocks 614*a*-614*c*, 704*a*-704*b*, etc.) with the at least one first ML block (e.g., the backbone/general block 702, the shared backbone block 612, etc.) may correspond to one of a plurality of association combinations between the at least one second ML block (e.g., the specific/dedicated blocks 614*a*-614*c*, 704*a*-704*b*, etc.) and the at least one first ML block (e.g., the backbone/general block 702, the shared backbone block 612, etc.). The activation, at 1210, may be performed by the activation component 1444 of the apparatus 1402 in FIG. 14.

At 1212, the UE may switch from the ML model to a different ML model of a plurality of models configured to the UE based on at least one of a model switching indication, a model switching index, a predefined protocol, an ML model complexity, or a performance level of the UE. For example, referring to FIGS. 5-6 and 10, the UE 1002 may switch ML models, at 1016, based on at least one of a model switching indication, a model switching index, a predefined protocol, an ML model complexity, or a performance level of the UE 1002. In the diagram 500, a plurality of ML models may be downloaded (e.g., at 526) to the UE 502 for switching between ML models. That is, the ML model may be included in a plurality of ML models configured to the UE 502 based on at least one of an ML model complexity or a performance level of the UE 502. The plurality of ML models may be configured to the UE 502/1002 (e.g., as indicated in the diagram 600) based on at least one of one or more tasks of the UE 502/1002 or one or more conditions of the UE 502/502. The switching, at 1212, may be performed by the switching component 1446 of the apparatus 1402 in FIG. 14.

Figure 13:
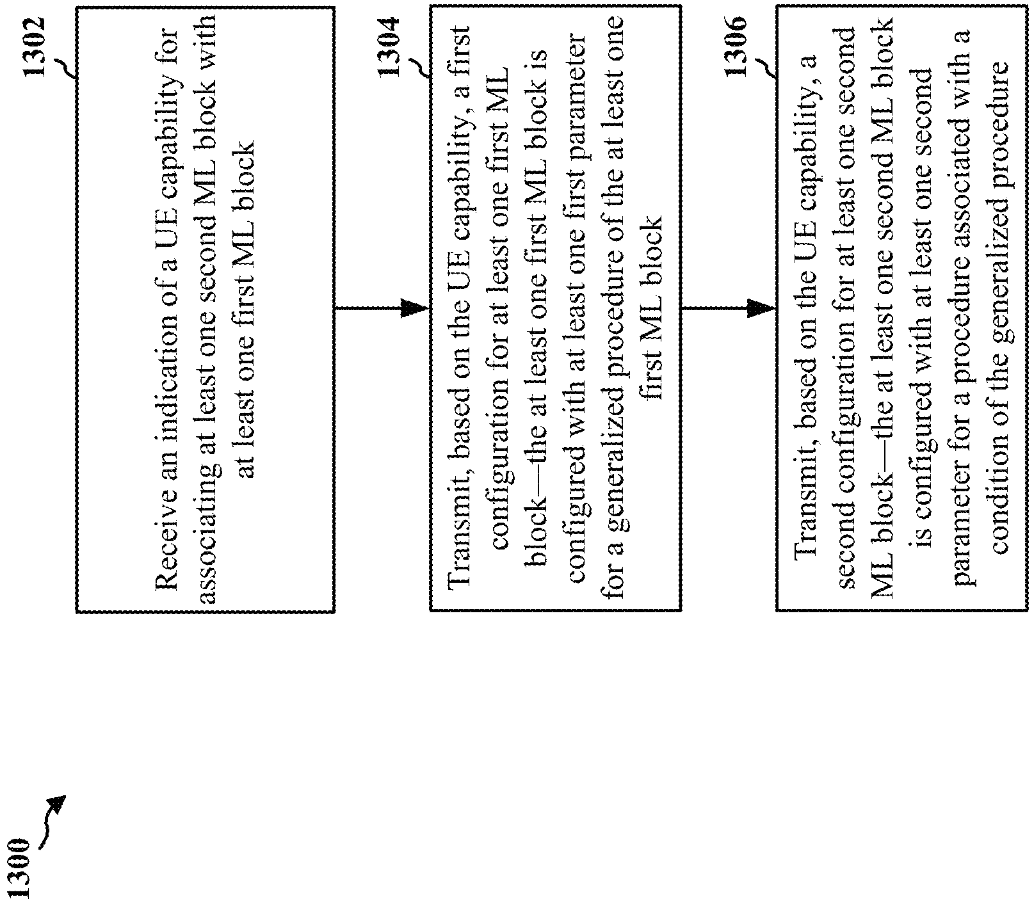
FIG. 13 is a flowchart of a method of wireless communication at a base station.

FIG. 13 is a flowchart 1300 of a method of wireless communication. The method may be performed by a base station (e.g., the base station 102, 1004; the second device 404; the network including the CU-CP 504, the ML model manager 506, and the DU 508; the apparatus 1502; etc.), which may include the memory 376 and which may be the entire base station 102, 1004 or a component of the base station 102, 1004, such as the TX processor 316, the RX processor 370, and/or the controller/processor 375. The method may be performed to balance ML model performance with ML model complexity.

At 1302, the base station may receive an indication of a UE capability for associating at least one second ML block with at least one first ML block. For example, referring to FIGS. 5-7 and 10, the base station 1004 may receive, at 1006, a UE capability from the UE 1002. The CU-CP 504 may also receive, at 510, a UE radio capability, a UE ML capability, etc., from the UE 502 in an RRC connection setup message. The at least one first ML block may correspond to a backbone block (e.g., the backbone/general block 702, the shared backbone block 612, etc.) and the at least one second ML block corresponds to a dedicated block (e.g., the specific/dedicated blocks 614*a*-614*c*, 704*a*-704*b*, etc.). The reception, at 1302, may be performed by the ML capability component 1540 of the apparatus 1502 in FIG. 15.

The UE capability received, at 510/1004, may be indicative of at least one of a first maximum number of first ML blocks, a second maximum number of second ML blocks per BWP, a third maximum number of second ML blocks per slot, or a fourth maximum number of simultaneously activate ML models. The association, at 1012, of the at least one second ML block (e.g., the specific/dedicated blocks 614*a*-614*c*, 704*a*-704*b*, etc.) with the at least one first ML block (e.g., the backbone/general block 702, the shared backbone block 612, etc.) may be based on at least one of a predefined protocol, a first indication of the at least one first ML block, a second indication of the at least one second ML block, a first index to the at least one first ML block, or a second index to the at least one second ML block. The at least one first ML block (e.g., the backbone/general block 702, the shared backbone block 612, etc.) and the at least one second ML block (e.g., the specific/dedicated blocks 614*a*-614*c*, 704*a*-704*b*, etc.) may each include one or more layers. The one or more layers may include at least one of a convolution layer, an FC layer, a pooling layer, or an activation layer. The association, at 1012, of the at least one second ML block (e.g., the specific/dedicated blocks 614*a*-614*c*, 704*a*-704*b*, etc.) with the at least one first ML block (e.g., the backbone/general block 702, the shared backbone block 612, etc.) may correspond to one of a plurality of association combinations between the at least one second ML block (e.g., the specific/dedicated blocks 614*a*-614*c*, 704*a*-704*b*, etc.) and the at least one first ML block (e.g., the backbone/general block 702, the shared backbone block 612, etc.).

A combined ML model may be activated, at 1014, based on the association, at 1012, of the at least one second ML block (e.g., the specific/dedicated blocks 614*a*-614*c*, 704*a*-704*b*, etc.) with the at least one first ML block (e.g., the backbone/general block 702, the shared backbone block 612, etc.). The ML model (e.g., downloaded, at 526, and activated, at 532/1014) may be included in a plurality of ML models configured to the UE 502/1002 based on at least one of an ML model complexity or a performance level of the UE 502/1002. The ML model may be switched, at 1016, to a different ML model of the plurality of models configured to the UE 1002 based on at least one of a model switching indication, a model switching index, a predefined protocol, the ML model complexity, or the performance level of the UE 1002. In the diagram 500, a plurality of ML models may be downloaded (e.g., at 526) to the UE 502 for switching between ML models. That is, the ML model may be included in a plurality of ML models configured to the UE 502 based on at least one of an ML model complexity or a performance level of the UE 502. The plurality of ML models may be configured to the UE 502/1002 (e.g., as indicated in the diagram 600) in association with at least one of one or more tasks of the UE 502/1002 or one or more conditions of the UE 502/502.

At 1304, the base station may transmit, based on the UE capability, a first configuration for at least one first ML block—the at least one first ML block is configured with at least one first parameter for a generalized procedure of the at least one first ML block. For example, referring to FIGS. 6-8 and 10, the base station 1004 may transmit, at 1008 to the UE 1002, a configuration for a backbone/general block, which may correspond to the backbone/general block 702, the shared backbone block 612, etc. The configuration transmitted, at 1008 to the UE 1002, for the backbone/general block may be based on one or more parameters indicated in the table 800. For example, the at least one first parameter may correspond to one or more of a backbone block ID, a timer, an input format, or a BWP ID, as indicated in the table 800. The transmission, at 1304, may be performed by the first configuration component 1542 of the apparatus 1502 in FIG. 15.

At 1306, the base station may transmit, based on the UE capability, a second configuration for at least one second ML block—the at least one second ML block is configured with at least one second parameter for a procedure associated with a condition of the generalized procedure. For example, referring to FIGS. 6-8 and 10, the base station 1004 may transmit, at 1010 to the UE 1002, a configuration for a specific/dedicated block, which may correspond to the specific/dedicated blocks 614*a*-614*c*, 704*a*-704*b*, etc. The configuration transmitted, at 1010 to the UE 1002, for the specific/dedicated block may be based on one or more parameters indicated in the table 900. For example, as indicated in the table 900, the at least one second parameter may correspond to one or more of a specific/dedicated block ID, a timer, a backbone block ID, a task ID, an output format, a specific/dedicated block type, a condition ID, a performance level granularity, or an index to the at least one first parameter. The association, at 1012, of the at least one second ML block (e.g., the specific/dedicated blocks 614*a*-614*c*, 704*a*-704*b*, etc.) with the at least one first ML block (e.g., the backbone/general block 702, the shared backbone block 612, etc.) may be triggered based on the transmission, at 1008, of the first configuration for the at least one first ML block and the transmission, at 1010, of the second configuration for the at least one second ML block. The transmission, at 1306, may be performed by the second configuration component 1544 of the apparatus 1502 in FIG. 15.

Figure 14:
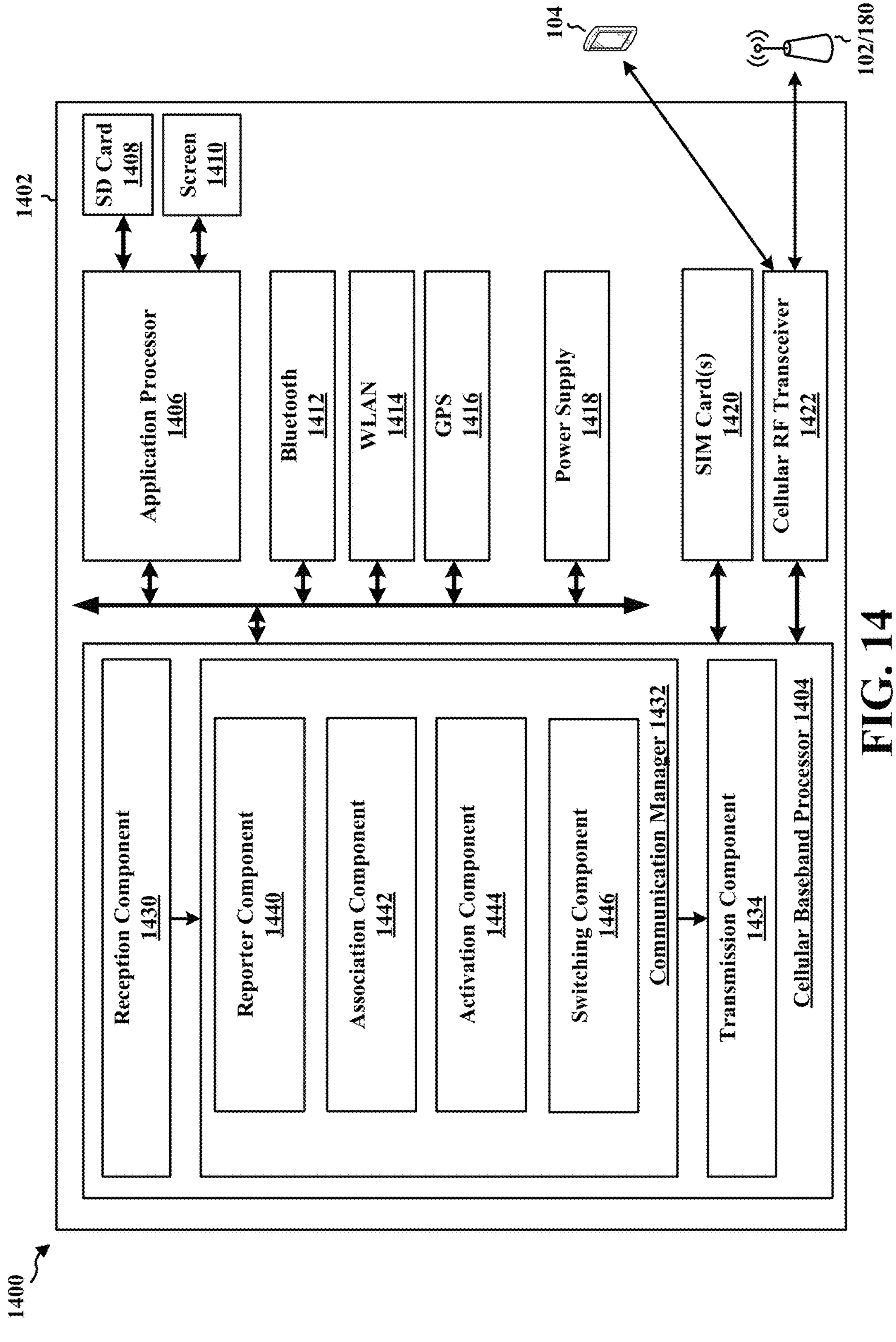
FIG. 14 is a diagram illustrating an example of a hardware implementation for an example apparatus.

FIG. 14 is a diagram 1400 illustrating an example of a hardware implementation for an apparatus 1402. The apparatus 1402 may be a UE, a component of a UE, or may implement UE functionality. In some aspects, the apparatus 1402 may include a cellular baseband processor 1404 (also referred to as a modem) coupled to a cellular RF transceiver 1422. In some aspects, the apparatus 1402 may further include one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, or a power supply 1418. The cellular baseband processor 1404 communicates through the cellular RF transceiver 1422 with the UE 104 and/or BS 102/180. The cellular baseband processor 1404 may include a computer-readable medium/memory. The computer-readable medium/memory may be non-transitory. The cellular baseband processor 1404 is responsible for general processing, including the execution of software stored on the computer-readable medium/memory. The software, when executed by the cellular baseband processor 1404, causes the cellular baseband processor 1404 to perform the various functions described supra. The computer-readable medium/memory may also be used for storing data that is manipulated by the cellular baseband processor 1404 when executing software. The cellular baseband processor 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the cellular baseband processor 1404. The cellular baseband processor 1404 may be a component of the UE 350 and may include the memory 360 and/or at least one of the TX processor 368, the RX processor 356, and the controller/processor 359. In one configuration, the apparatus 1402 may be a modem chip and include just the baseband processor 1404, and in another configuration, the apparatus 1402 may be the entire UE (e.g., see 350 of FIG. 3) and include the additional modules of the apparatus 1402.

The reception component 1430 is configured, e.g., as described in connection with 1102, 1104, 1204, and 1206, to receive a first configuration for the at least one first ML block—the at least one first ML block is configured with at least one first parameter for a generalized procedure of the at least one first ML block; and to receive a second configuration for the at least one second ML block—the at least one second ML block is configured with at least one second parameter for a procedure associated with a condition of the generalized procedure. The communication manager 1432 includes a reporter component 1440 that is configured, e.g., as described in connection with 1202, to report a UE capability for associating at least one second ML block with at least one first ML block. The communication manager 1432 further includes an association component 1442 that is configured, e.g., as described in connection with 1208, to associate, based on the at least one second parameter, the at least one second ML block with the at least one first ML block configured with the at least one first parameter. The communication manager 1432 further includes an activation component 1444 that is configured, e.g., as described in connection with 1106 and 1210, to activate an ML model based on associating the at least one second ML block configured with the at least one second parameter with the at least one first ML block configured with the at least one first parameter. The communication manager 1432 further includes a switching component 1446 that is configured, e.g., as described in connection with 1212, to switch from the ML model to a different ML model of a plurality of models configured to the UE based on at least one of a model switching indication, a model switching index, a predefined protocol, an ML model complexity, or a performance level of the UE.

The apparatus may include additional components that perform each of the blocks of the algorithm in the flowcharts of FIGS. 11-12. As such, each block in the flowcharts of FIGS. 11-12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1402 may include a variety of components configured for various functions. In one configuration, the apparatus 1402, and in particular the cellular baseband processor 1404, includes means for receiving a first configuration for at least one first ML block, the at least one first ML block configured with at least one first parameter for a generalized procedure of the at least one first ML block; means for receiving a second configuration for at least one second ML block, the at least one second ML block configured with at least one second parameter for a procedure associated with a condition of the generalized procedure; and means for activating an ML model based on an association of the at least one second ML block configured with the at least one second parameter with the at least one first ML block configured with the at least one first parameter. The apparatus 1402 further includes means for associating, based on the at least one second parameter, the at least one second ML block with the at least one first ML block configured with the at least one first parameter. The apparatus 1402 further includes means for reporting a UE capability for associating the at least one second ML block with the at least one first ML block. The apparatus 1402 further includes means for switching from the ML model to a different ML model of the plurality of models configured to the UE based on at least one of a model switching indication, a model switching index, a predefined protocol, the ML model complexity, or the performance level of the UE.

The means may be one or more of the components of the apparatus 1402 configured to perform the functions recited by the means. As described supra, the apparatus 1402 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 15:
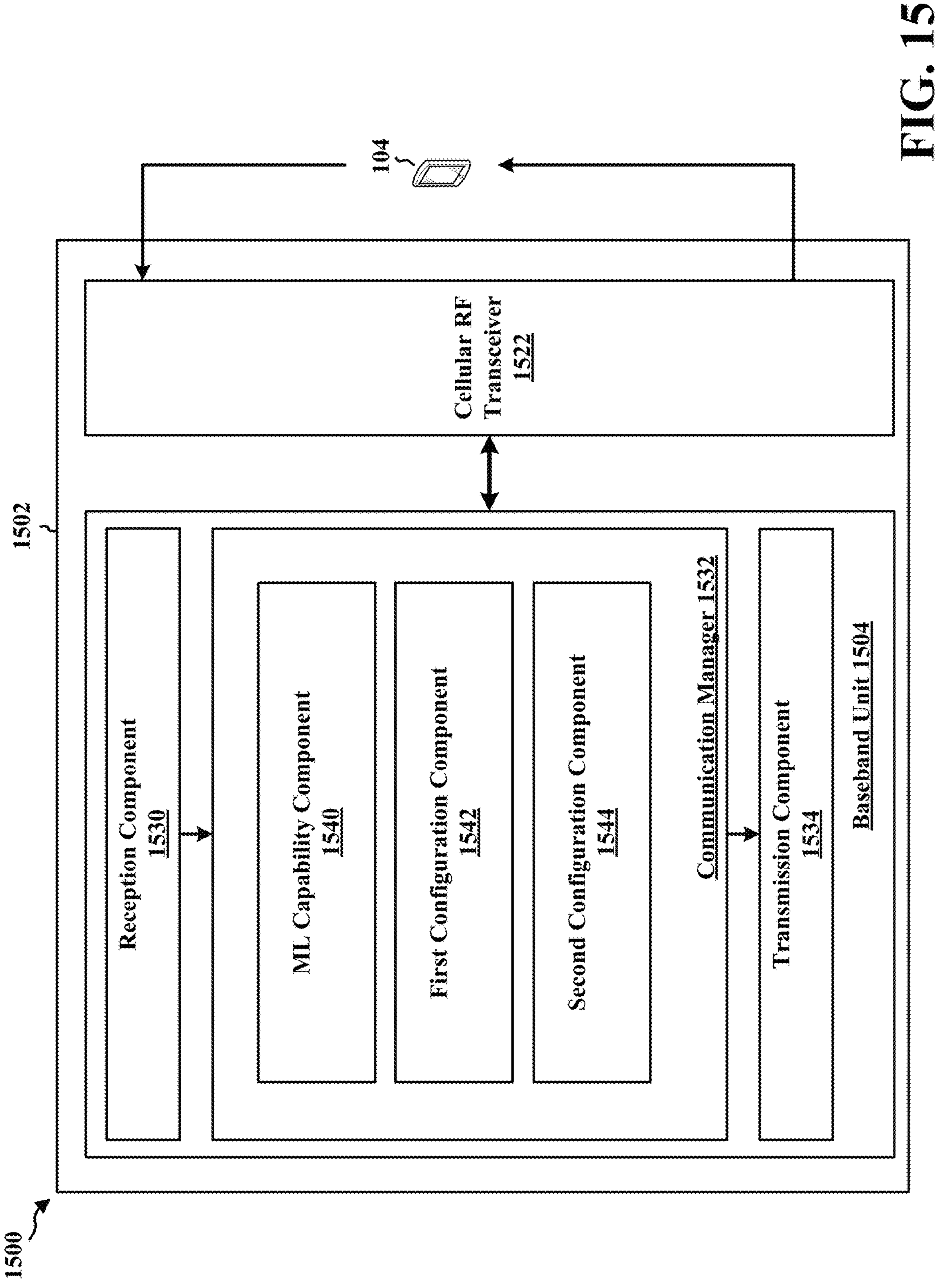
FIG. 15 is a diagram illustrating an example of a hardware implementation for an example apparatus.

FIG. 15 is a diagram 1500 illustrating an example of a hardware implementation for an apparatus 1502. The apparatus 1502 may be a base station, a component of a base station, or may implement base station functionality. In some aspects, the apparatus 1402 may include a baseband unit 1504. The baseband unit 1504 may communicate through a cellular RF transceiver 1522 with the UE 104. The baseband unit 1504 may include a computer-readable medium/memory. The baseband unit 1504 is responsible for general processing, including the execution of software stored on the computer-readable medium/memory. The software, when executed by the baseband unit 1504, causes the baseband unit 1504 to perform the various functions described supra. The computer-readable medium/memory may also be used for storing data that is manipulated by the baseband unit 1504 when executing software. The baseband unit 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the baseband unit 1504. The baseband unit 1504 may be a component of the base station 310 and may include the memory 376 and/or at least one of the TX processor 316, the RX processor 370, and the controller/processor 375.

The communication manager 1532 includes an ML capability component 1540 that is configured, e.g., as described in connection with 1302, to receive an indication of a UE capability for associating at least one second ML block with at least one first ML block. The communication manager 1532 further includes a first configuration component 1542 that is configured, e.g., as described in connection with 1304, to transmit, based on the UE capability, a first configuration for at least one first ML block—the at least one first ML block is configured with at least one first parameter for a generalized procedure of the at least one first ML block. The communication manager 1532 further includes a second configuration component 1544 that is configured, e.g., as described in connection with 1306, to transmit, based on the UE capability, a second configuration for at least one second ML block—the at least one second ML block is configured with at least one second parameter for a procedure associated with a condition of the generalized procedure.

The apparatus may include additional components that perform each of the blocks of the algorithm in the flowchart of FIG. 13. As such, each block in the flowchart of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1502 may include a variety of components configured for various functions. In one configuration, the apparatus 1502, and in particular the baseband unit 1504, includes means for receiving an indication of a UE capability for associating at least one second ML block with at least one first ML block; means for transmitting, based on the UE capability, a first configuration for at least one first ML block, the at least one first ML block configured with at least one first parameter for a generalized procedure of the at least one first ML block; and means for transmitting, based on the UE capability, a second configuration for at least one second ML block, the at least one second ML block configured with at least one second parameter for a procedure associated with a condition of the generalized procedure.

The means may be one or more of the components of the apparatus 1502 configured to perform the functions recited by the means. As described supra, the apparatus 1502 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a UE including receiving a first configuration for at least one first ML block, the at least one first ML block configured with at least one first parameter for a first procedure of the at least one first ML block; receiving a second configuration for at least one second ML block, the at least one second ML block configured with at least one second parameter for a second procedure of the at least one second ML block, the at least one second ML block dedicated to a task included in a plurality of tasks associated with the at least one first ML block; and activating an ML model based on an association of the at least one second ML block configured with the at least one second parameter with the at least one first ML block configured with the at least one first parameter.

Aspect 2 may be combined with aspect 1 and includes that the at least one first ML block corresponds to a backbone block.

Aspect 3 may be combined with any of aspects 1-2 and includes that the at least one second ML block corresponds to a dedicated block.

Aspect 4 may be combined with any of aspects 1-3 and includes that the at least one first parameter corresponds to one or more of a backbone block ID, a timer, an input format, or a BWP ID.

Aspect 5 may be combined with any of aspects 1-4 and includes that the at least one second parameter corresponds to one or more of a dedicated block ID, a timer, a backbone block ID, a task ID, an output format, a dedicated block type, a condition ID, a performance level granularity, or an index to the at least one first parameter.

Aspect 6 may be combined with any of aspects 1-5 and further includes associating, based on the at least one second parameter, the at least one second ML block with the at least one first ML block configured with the at least one first parameter.

Aspect 7 may be combined with any of aspects 1-6 and further includes reporting a UE capability for associating the at least one second ML block with the at least one first ML block.

Aspect 8 may be combined with any of aspects 1-7 and includes that the UE capability is indicative of at least one of a first maximum number of first ML blocks, a second maximum number of second ML blocks per BWP, a third maximum number of second ML blocks per slot, or a fourth maximum number of simultaneously activate ML models.

Aspect 9 may be combined with any of aspects 1-8 and includes that the association of the at least one second ML block with the at least one first ML block is based on at least one of a predefined protocol, a first indication of the at least one first ML block, a second indication of the at least one second ML block, a first index to the at least one first ML block, or a second index to the at least one second ML block.

Aspect 10 may be combined with any of aspects 1-9 and includes that the ML model is included in a plurality of ML models configured to the UE based on at least one of an ML model complexity or a performance level of the UE.

Aspect 11 may be combined with any of aspects 1-10 and further includes switching from the ML model to a different ML model of the plurality of ML models configured to the UE based on at least one of a model switching indication, a model switching index, a predefined protocol, the ML model complexity, or the performance level of the UE.

Aspect 12 may be combined with any of aspects 1-11 and includes that the plurality of ML models is configured to the UE based on at least one of one or more tasks of the UE or one or more conditions of the UE.

Aspect 13 may be combined with any of aspects 1-12 and includes that the at least one first ML block includes one or more layers.

Aspect 14 may be combined with any of aspects 1-13 and includes that the at least one second ML block includes one or more layers.

Aspect 15 may be combined with any of aspects 1-14 and includes that the one or more layers includes at least one of a convolution layer, an FC layer, a pooling layer, or an activation layer.

Aspect 16 may be combined with any of aspects 1-15 and includes that the association of the at least one second ML block with the at least one first ML block corresponds to one of a plurality of association combinations between the at least one second ML block and the at least one first ML block.

Aspect 17 may be combined with any of aspects 1-16 and further includes performing the method based on at least one of an antenna or a transceiver.

Aspect 18 is a method of wireless communication at a base station including receiving an indication of a UE capability for associating at least one second ML block with at least one first ML block; transmitting, based on the UE capability, a first configuration for the at least one first ML block, the at least one first ML block configured with at least one first parameter for a first procedure of the at least one first ML block; and transmitting, based on the UE capability, a second configuration for at least one second ML block, the at least one second ML block configured with at least one second parameter for a second procedure of the at least one second ML block, the at least one second ML block dedicated to a task included in a plurality of tasks associated with the at least one first ML block.

Aspect 19 may be combined with aspect 18 and includes that the at least one first ML block corresponds to a backbone block.

Aspect 20 may be combined with any of aspects 18-19 and includes that the at least one second ML block corresponds to a dedicated block.

Aspect 21 may be combined with any of aspects 18-20 and includes that the at least one first parameter corresponds to one or more of a backbone block ID, a timer, an input format, or a BWP ID.

Aspect 22 may be combined with any of aspects 18-21 and includes that the at least one second parameter corresponds to one or more of a dedicated block ID, a timer, a backbone block ID, a task ID, an output format, a dedicated block type, a condition ID, a performance level granularity, or an index to the at least one first parameter.

Aspect 23 may be combined with any of aspects 18-22 and includes that association of the at least one second ML block with the at least one first ML block is triggered based on transmitting the first configuration for the at least one first ML block.

Aspect 24 may be combined with any of aspects 18-23 and includes that association of the at least one second ML block with the at least one first ML block is triggered based on transmitting the second configuration for the at least one second ML block.

Aspect 25 may be combined with any of aspects 18-24 and includes that the UE capability is indicative of at least one of a first maximum number of first ML blocks, a second maximum number of second ML blocks per BWP, a third maximum number of second ML blocks per slot, or a fourth maximum number of simultaneously activate ML models.

Aspect 26 may be combined with any of aspects 18-25 and includes that the association of the at least one second ML block with the at least one first ML block is based on at least one of a predefined protocol, a first indication of the at least one first ML block, a second indication of the at least one second ML block, a first index to the at least one first ML block, or a second index to the at least one second ML block.

Aspect 27 may be combined with any of aspects 18-26 and includes that an ML model is activated based on the association of the at least one second ML block with the at least one first ML block.

Aspect 28 may be combined with any of aspects 18-27 and includes that the ML model is included in a plurality of ML models configured to the UE based on at least one of an ML model complexity or a performance level of the UE.

Aspect 29 may be combined with any of aspects 18-28 and includes that the ML model is switched to a different ML model of the plurality of models configured to the UE based on at least one of a model switching indication, a model switching index, a predefined protocol, the ML model complexity, or the performance level of the UE.

Aspect 30 may be combined with any of aspects 18-29 and includes that the plurality of ML models is configured to the UE in association with at least one of one or more tasks of the UE or one or more conditions of the UE.

Aspect 31 may be combined with any of aspects 18-30 and includes that the at least one first ML block includes one or more layers.

Aspect 32 may be combined with any of aspects 18-31 and includes that the at least one second ML block includes one or more layers.

Aspect 33 may be combined with any of aspects 18-32 and includes that the one or more layers includes at least one of a convolution layer, an FC layer, a pooling layer, or an activation layer.

Aspect 34 may be combined with any of aspects 18-33 and includes that the association of the at least one second ML block with the at least one first ML block corresponds to one of a plurality of association combinations between the at least one second ML block and the at least one first ML block.

Aspect 35 may be combined with any of aspects 18-34 and further includes performing the method based on at least one of an antenna or a transceiver.

Aspect 36 is an apparatus for wireless communication configured to perform the method of any of aspects 1-17.

Aspect 37 is an apparatus for wireless communication including means for performing the method of any of aspects 1-17.

Aspect 38 is a non-transitory computer-readable storage medium storing computer executable code, the code when executed by at least one processor causes the at least one processor to perform the method of any of aspects 1-17.

Aspect 39 is an apparatus for wireless communication configured to perform the method of any of aspects 18-35.

Aspect 40 is an apparatus for wireless communication including means for performing the method of any of aspects 18-35.

Aspect 41 is a non-transitory computer-readable storage medium storing computer executable code, the code when executed by at least one processor causes the at least one processor to perform the method of any of aspects 18-35.

What is claimed is:

1. An apparatus for wireless communication at a user equipment (UE), comprising:
memory; and
one or more processors coupled to the memory and configured to cause the UE to:
receive a first configuration for at least one first machine learning (ML) block that is a backbone block associated with a plurality of tasks, wherein the at least one first ML block is configured with at least one first parameter for a first procedure of the at least one first ML block;
receive a second configuration for at least one second ML block, wherein the at least one second ML block is configured with at least one second parameter for a second procedure of the at least one second ML block, and wherein the at least one second ML block is dedicated to a task included in the plurality of tasks associated with the at least one first ML block; and
activate an ML model based on an association of the at least one second ML block configured with the at least one second parameter with the at least one first ML block configured with the at least one first parameter, wherein an indication of the second configuration for the at least one second ML block includes a backbone block identifier (ID) that identifies the backbone block of the at least one first ML block.

2. The apparatus of claim 1, wherein the at least one second ML block corresponds to a dedicated block.

3. The apparatus of claim 1, wherein the at least one first parameter corresponds to one or more of the backbone block ID, a timer, an input format, or a bandwidth part (BWP) ID.

4. The apparatus of claim 1, wherein the at least one second parameter corresponds to one or more of a dedicated block identifier (ID), a timer, a task ID, an output format, a dedicated block type, a condition ID, a performance level granularity, or an index to the at least one first parameter.

5. The apparatus of claim 4, wherein the one or more processors are further configured to cause the UE to associate, based on the at least one second parameter, the at least one second ML block with the at least one first ML block configured with the at least one first parameter.

6. The apparatus of claim 1, further comprising an antenna coupled to the one or more processors, wherein the one or more processors are further configured to cause the UE to report a UE capability to associate the at least one second ML block with the at least one first ML block.

7. The apparatus of claim 6, wherein the UE capability is indicative of at least one of a first maximum number of first ML blocks, a second maximum number of second ML blocks per bandwidth part (BWP), a third maximum number of second ML blocks per slot, or a fourth maximum number of simultaneously activate ML models.

8. The apparatus of claim 1, wherein the association of the at least one second ML block with the at least one first ML block is based on at least one of a predefined protocol, a first indication of the at least one first ML block, a second indication of the at least one second ML block, a first index to the at least one first ML block, or a second index to the at least one second ML block.

9. The apparatus of claim 1, wherein the ML model is included in a plurality of ML models configured to the UE based on at least one of an ML model complexity or a performance level of the UE.

10. The apparatus of claim 9, wherein the one or more processors are further configured to cause the UE to switch from the ML model to a different ML model of the plurality of ML models configured to the UE based on at least one of a model switching indication, a model switching index, a predefined protocol, the ML model complexity, or the performance level of the UE.

11. The apparatus of claim 9, wherein the plurality of ML models is configured to the UE based on at least one of one or more tasks of the UE or one or more conditions of the UE.

12. The apparatus of claim 1, wherein the at least one first ML block and the at least one second ML block each include one or more layers, and wherein the one or more layers include at least one of a convolution layer, a fully connected (FC) layer, a pooling layer, or an activation layer.

13. The apparatus of claim 1, wherein the association of the at least one second ML block with the at least one first ML block corresponds to one of a plurality of association combinations between the at least one second ML block and the at least one first ML block.

14. An apparatus for wireless communication at a network entity, comprising:
memory; and
one or more processors coupled to the memory and configured to cause the network entity to:
receive an indication of a user equipment (UE) capability to associate at least one second machine learning (ML) block with at least one first ML block;
transmit, based on the UE capability, a first configuration for the at least one first ML block that is a backbone block associated with a plurality of tasks, wherein the at least one first ML block is configured with at least one first parameter for a first procedure of the at least one first ML block; and
transmit, based on the UE capability, a second configuration for at least one second ML block, the at least one second ML block configured with at least one second parameter for a second procedure of the at least one second ML block, wherein the at least one second ML block is dedicated to a task included in the plurality of tasks associated with the at least one first ML block, and wherein an indication of the second configuration for the at least one second ML block includes a backbone block identifier (ID) that identifies the backbone block of the at least one first ML block.

15. The apparatus of claim 14, wherein the at least one second ML block corresponds to a dedicated block.

16. The apparatus of claim 14, wherein the at least one first parameter corresponds to one or more of the backbone block ID, a timer, an input format, or a bandwidth part (BWP) ID.

17. The apparatus of claim 14, wherein the at least one second parameter corresponds to one or more of a dedicated block identifier (ID), a timer, a task ID, an output format, a dedicated block type, a condition ID, a performance level granularity, or an index to the at least one first parameter.

18. The apparatus of claim 17, wherein an association of the at least one second ML block with the at least one first ML block is triggered based on transmission of the first configuration for the at least one first ML block and the second configuration for the at least one second ML block.

19. The apparatus of claim 14, wherein the UE capability is indicative of at least one of a first maximum number of first ML blocks, a second maximum number of second ML blocks per bandwidth part (BWP), a third maximum number of second ML blocks per slot, or a fourth maximum number of simultaneously activate ML models.

20. The apparatus of claim 14, wherein an association of the at least one second ML block with the at least one first ML block is based on at least one of a predefined protocol, a first indication of the at least one first ML block, a second indication of the at least one second ML block, a first index to the at least one first ML block, or a second index to the at least one second ML block.

21. The apparatus of claim 14, wherein an ML model is activated based on an association of the at least one second ML block with the at least one first ML block.

22. The apparatus of claim 21, wherein the ML model is included in a plurality of ML models configured to the UE based on at least one of an ML model complexity or a performance level of the UE.

23. The apparatus of claim 22, wherein the ML model is switched to a different ML model of the plurality of models configured to the UE based on at least one of a model switching indication, a model switching index, a predefined protocol, the ML model complexity, or the performance level of the UE.

24. The apparatus of claim 22, wherein the plurality of ML models is configured to the UE in association with at least one of one or more tasks of the UE or one or more conditions of the UE.

25. The apparatus of claim 14, wherein the at least one first ML block and the at least one second ML block each includes one or more layers, and wherein the one or more layers include at least one of a convolution layer, a fully connected (FC) layer, a pooling layer, or an activation layer.

26. The apparatus of claim 14, wherein an association of the at least one second ML block with the at least one first ML block corresponds to one of a plurality of association combinations between the at least one second ML block and the at least one first ML block.

27. A method of wireless communication at a user equipment (UE), comprising:

receiving a first configuration for at least one first machine learning (ML) block that is a backbone block associated with a plurality of tasks, wherein the at least one first ML block is configured with at least one first parameter for a first procedure of the at least one first ML block;

receiving a second configuration for at least one second ML block, wherein the at least one second ML block is configured with at least one second parameter for a second procedure of the at least one second ML block, and wherein the at least one second ML block is dedicated to a task included in the plurality of tasks associated with the at least one first ML block; and activating an ML model based on an association of the at least one second ML block configured with the at least one second parameter with the at least one first ML block configured with the at least one first parameter, wherein an indication of the second configuration for the at least one second ML block includes a backbone block identifier (ID) that identifies the backbone block of the at least one first ML block.

28. The method of claim 27, wherein the at least one second ML block corresponds to a dedicated block.

29. A method of wireless communication at a network entity, comprising:

receiving an indication of a user equipment (UE) capability for associating at least one second machine learning (ML) block with at least one first ML block;

transmitting, based on the UE capability, a first configuration for the at least one first ML block that is a backbone block associated with a plurality of tasks, wherein the at least one first ML block is configured with at least one first parameter for a first procedure of the at least one first ML block; and transmitting, based on the UE capability, a second configuration for at least one second ML block, the at least one second ML block configured with at least one second parameter for a second procedure of the at least one second ML block, wherein the at least one second ML block is dedicated to a task included in the plurality of tasks associated with the at least one first ML block, and wherein an indication of the second configuration for the at least one second ML block includes a backbone block identifier (ID) that identifies the backbone block of the at least one first ML block.

30. The method of claim 29, wherein the at least one second ML block corresponds to a dedicated block.

* * * * *